US006581831B2

(12) United States Patent
Madani

(10) Patent No.: US 6,581,831 B2
(45) Date of Patent: Jun. 24, 2003

(54) DEBIT CARD READ/WRITE CONTROLLER AND PROCESS

(75) Inventor: Mohammad Reza Madani, Lafayette, LA (US)

(73) Assignee: University of Louisiana at Lafayette, Lafayette, LA (US)

( * ) Notice: Subject to any disclaimer, the term of this patent is extended or adjusted under 35 U.S.C. 154(b) by 63 days.

(21) Appl. No.: 09/740,328

(22) Filed: Dec. 18, 2000

(65) Prior Publication Data

US 2002/0074401 A1 Jun. 20, 2002

(51) Int. Cl.⁷ .................................................. G06K 7/08
(52) U.S. Cl. ............................ 235/449; 235/380; 360/2
(58) Field of Search ................................. 235/449, 480, 235/440, 483, 380; 340/146; 360/2

(56) References Cited

U.S. PATENT DOCUMENTS

| 4,232,216 A | * | 11/1980 | Helle | 235/449 |
| 4,788,420 A | * | 11/1988 | Chang et al. | 235/449 |
| 5,438,186 A | * | 8/1995 | Nair et al. | 235/379 |

OTHER PUBLICATIONS

ISO / IEC CD 7811–6.

* cited by examiner

Primary Examiner—Michael G. Lee
Assistant Examiner—Edwyn Cabaze
(74) Attorney, Agent, or Firm—Domingue & Waddell, PLC

(57) ABSTRACT

A debit card read/write controller. The controller comprises a microcontroller device, a read only memory, a dynamically random access memory and a read/write head for reading and writing onto a magnetic card media contained on a magnetic striped card. The microcontroller device includes an input capture port for storing data read from the card, and wherein the microcontroller device continually poles the input capture port for an event to occur. The entire read/write system can be integrated into one single chip. The steps for processing the signal, processing the signal, and writing to the stripes have also been disclosed. The steps generally include inserting the card into a card reader operatively associated with the MR read head and passing manually the stripe underneath the MR read head, and wherein the information on the magnetic card media is stored in the form of a plurality of magnetic flux reversals. Next, the magnetic flux reversal is detected by the MR head as the stripe moves under the MR head, an analog signal is generated, conditioned, amplified and converted to a square wave. The input capture port polls the microcontroller for a flux reversal contained on the stripe to occur, and thereafter stores the timing value in memory. The stored timing is converted to timing pulse width associated with zero/one, read from the magnetic stripe. The information is converted to the designated characters according to the ISO/IEC CD 7811. The security and authentication of the data can be checked. For the read/write process in manual mode, the write head and read head is placed 2 to 3 bits distance apart.

5 Claims, 25 Drawing Sheets

FIGURE 14

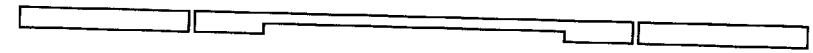
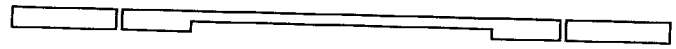
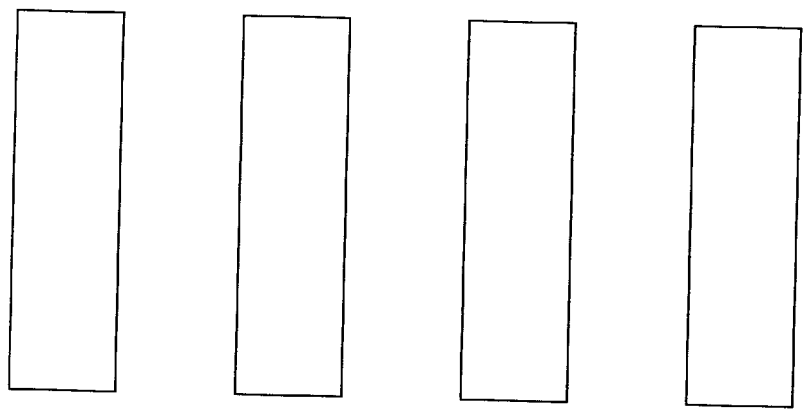
FIGURE 15

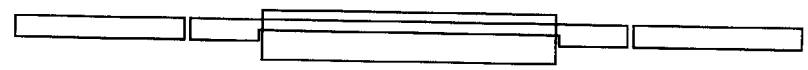
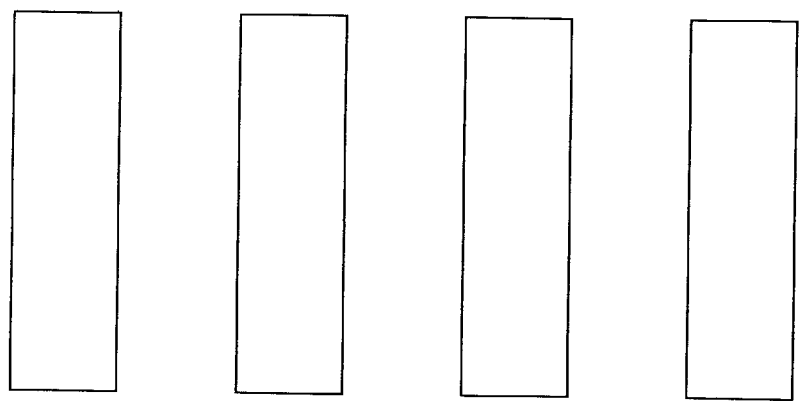
FIGURE 16

DEBIT CARD READ/WRITE CONTROLLER AND PROCESS

BACKGROUND OF THE INVENTION

This invention relates to use of a microcontroller to read/write data from/to a plurality of tracks contained on a magnetic stripe value card. More particularly, but not by way of limitation, this invention relates to a system and method for reading and writing data to a magnetic striped card with the use of a microcontroller.

The use of magnetic cards in modern society is well documented. For instance, credit cards are used throughout the worlds. The number of daily transaction using magnetic stripe cards has increased. Business establishments such as supermarkets, stores, gas stations, restaurants, and hotels are providing means to accept credit cards and debit cards as a common way to do business. The applications of magnetic stripe cards in e-commerce, and point of sale terminals drive the technology toward more secure and more economical ways of reading and writing of the magnetic stripe cards.

Recently, a new type of card, sometimes referred to as a smart card, has been used by businesses. Generally, the smart card contains a microprocessor that allows for the reading and writing of data as the card is inserted into a card reader. However, the minimum price of a plastic card is about $2 which is much more expensive than the price of a plastic magnetic stripe card.

Kobayashi et al have described (U.S. Pat. No. 4,304,992) magnetic cards with a timing track or clocking marker along the length of the magnetic stripe can be extended for reader/writer systems to handle speed variation of the card during read/write process. Magnetic heads are moved in sliding contact with the magnetic strips while timing signal that match the speed of the card is obtained from the timing track through detectors such as photo-sensors. Other prior art devices have tried to extract the timing clock from the data on the card using logic gated design.

The read/write system for debit card applications of digital logic design is very complex. Also, when the distance between write head and read head along the magnetic stripe is less than a bit cell length, the written part of the magnetic stripe will shift after each usage. For example, if the distance between read head and write head is one half bit cell distance and the debit card is used 100 times, the flux data on the stripe will shift 1.2 cm. The data flux reversal on the track-2 of the magnetic stripe will shift 1.2 cm.

The wide spread use of credit/debit cards will contribute to bottle necking of the communication lines and also will increase the seriousness of the network security. Thus, there is a need for development of stand alone reader/writer systems that will ease the above concerns. There is also a need for storing data locally, which data can then be sent in less congested times of network use to the appropriate destinations. Further, there is a need for more security that can be embedded into the system by software which in turn will reduce the cost and increase the reliability of the system.

Thus, there is a need for a magnetic card read/writer for debit card applications that will use the written data on the card to accommodate the variation of speed in swipe/insertion utilizing a general use microcontroller. Also, there is a need for a system and method for magnetic card applications that allow for fast read and write operations. The invention herein disclosed fulfills that need, and many others, as will be readily apparent from a reading of this disclosure.

SUMMARY OF THE INVENTION

The novel debit card read/write controller consists of a microcontroller device, a read only memory TOM) means, and a dynamic random access memory (DRAM) means. In the preferred embodiment, all of the components can be integrated into one dedicated chip. The integration of the magneto resistive (MR) read head/thin-film write head with the dedicated chip is described. The controller includes means for reading and writing into magnetic card media. Additionally, a process to integrate all components and chips into a single chip along with the read/write head is disclosed.

The controller may further comprise circuitry means for implementing the microcontroller chip to read and write to the magnetic card media. The microcontroller includes an input capture port for storing data read from the card, and the microcontroller can continually pole the input capture pins for an event to occur. In the most preferred embodiment, the main 16-bit free-running timer system of the MC68C11 series microcontroller has three input capture lines, five output-compare lines, and a real-time interrupt function. The newer version of the MC68C11 allows one output-compare channel to reconfigure as a fourth input capture line. Input lines are used to record timing edges.

The microcontroller operates in an expanded mode and has a memory map from 0000h to FFFFh. The first 256 bytes in all modes reside in the DRAM, a 64 byte register block in the range 1000h to 103Fh, and the final 2000 bytes are in an electrically erasable read only memory (EEPROM). The expanded mode allows for external chips DRAM or EEPROM to be addressed in the remaining ranges of 0100h-0FFFh and 1040h-B7FFh.

In the preferred embodiment, the executable code is stored in the EEPROM beginning at 8000h. The controller further comprises a signal conditioning circuit in a three stage process. In the preferred embodiment, the card contains three magnetic card media tracks. Additionally, the controller can contain output compare function means for comparing the time of the free running clock to match the time in the output compare register to toggle an output pin at each flux reversal to write.

A method for reading and writing to a magnetic strip located on a card is also disclosed. The method comprises providing a message to insert a card containing a magnetic card media and polling the input capture port for an event to occur. The card is inserted into a card reader, with the card reader being operatively associated with a MR read head and thin-film write head. The magnetic card media is passed underneath the MR head, and the information on the magnetic card media is stored in the form of a plurality of magnetic flux reversals. Changes in the resistance is detected by the MR head as the card moves under the MR head which in turn generates an analog signal. The analog signal is conditioned and amplified.

The signal is conditioned to a square wave. The square wave will include time edges containing rising and falling edge data, and the method further comprises storing a time edge at which transitions of the square wave occurs via the microcontroller by means of the input capture ports, with the time data of the edge being stored to the RAM. The method further includes extracting the binary information from the time edges and storing the extracted binary information in the RAM.

In one of the embodiments, the step of polling the input capture ports includes continually checking an interrupt pin to determine if the end of the card has been reached. It should be noted that in one embodiment this may be performed with an optical sensor, and in a second embodiment this may be performed with a micro-switch. The method further includes sending a low signal to an active low IRQ pin from the card reading device, and detecting the low signal by the program. Next, the interrupt service subroutine is entered and the interrupt vector (which is located at the memory address from FFF2h to FFF3h) is retrieved.

In one of the embodiments herein disclosed, the step of conditioning and amplifying the signal includes amplifying the signal with operational amplifiers until the signal is in the form of +5V to −5V analog signal. The signal is then passed through a schmitt trigger and a diode so that the signal is in a digital format (using the TTL logic level) which is the form necessary for use by the microcontroller.

A method of reading from a magnetic striped card with a debit card read/write controller is also disclosed. The method comprises producing a waveform that consist of a series of rising and falling edges representing a series of flux reversals, and extracting a time based on whether a flux reversal occurs between a clocking transition. Binary data representative of the flux reversals is generated, and wherein an 0 is generated if no flux reversal occurs between the clocking transition and a 1 is generated if a flux reversal occurs between the clocking transition. The method includes waiting in a loop until an edge has been detected. The time of each transition is recorded as either a rising or falling edge of the incoming signal via the input capture port.

The method includes detecting when the entire track has been read and exiting from the loop. The method includes storing the time of the rising or falling edges and holding the address value corresponding to the last memory location and storing the time in a counter.

In one of the embodiments, the step of generating binary data includes transforming the flux data to binary data, and the method further comprises measuring the time between clocking transitions to calculate a pulse width time, and wherein if the pulse width time of the current signal is greater than a predetermined expected time, an 01 is generated representing a missing flux reversal between the clocking transition. The generated binary data 01 is stored in memory, and the measured time between clocking transitions is used to calculate a pulse width time, and if the pulse width of the current signal is less than the predetermined expected time, a 1 is generated representing a flux reversal between the clocking transition thereby generating a 1.

The method further includes decoding the entire waveform on the magnetic strip by proceeding through the array held at the first time buffer and computing each pulse width as Ti-Ti-1, then comparing the value to the predetermined expected time. If the pulse width 2 is greater than the expected time, the 01 is shifted into memory at flux buffer 1, and if pulse width 2 is less than the expected time, a 1 is shifted into memory. Thereafter, the expected time is recomputing every time an 01 or 11 combination is found.

The method further comprises extracting the binary information from the data held at the flux buffer, and wherein the binary information is extracted by shifting data held at the flux buffer once to the left, checking the carry bit, and thereafter, shifting the data held at the flux buffer left again, until a 1 is held in the carry flag. Next, the binary buffer array is incremented with a counter so that when a character is full, the next byte in the array is used. This routine will be exited, and the data is held in the memory at the binary buffer. A parity check for each data character and a longitudinal redundancy character (LRC) check is performed.

In one of the embodiments, the controller comprises a read head and write head placed exactly one half of a clocking transition apart from each other, and the method further comprises writing to the magnetic stripe(s). The step of writing includes the read head detecting the signal that was just written, and directing the write head what to do next. The method further comprises recording the times for successive edges on the incoming binary data, determining the period and/or pulse width of the signal, measuring a period, and measuring a pulse width. The step of measuring the period includes capturing two successive edges of the same polarity and the step of measuring the pulse width includes capturing two alternate polarity edges.

The method may further include polling the input capture port and latching the time to the microcontroller that an edge has been detected. Then, the time of that event is recorded in a memory buffer and wherein the polling loop simply detects whether a read has occurred and inside of the read subroutine, the next write must either take place or be programmed to take place. Thereafter, the method compares the time of the free running clock with the output compare (OC) register, and the time of the free running clock is matched with the OC register and the output pin is toggled to cause the write head to write to the magnetic stripe.

In the most preferred embodiment of this application, a process of writing to a magnetic stripe on a card with the integration of a microcontroller is also disclosed. In this embodiment, the MR read head and the write head are placed three times a bit cell distance apart and wherein the bit cell distance is defined as the distance between the two clocking flux transitions. The process starts with initialization to set all of the parameters (memory locations) to their initial values. The microcontroller waits to detect a transition. Once a positive transition or negative transition is detected, the transitions timing value is stored in a word in the memory address designated as CURR. If the detected edge is the first edge, a word in memory called FIRST is set to one. The content of CURR is stored in memory location PREV and then it waits for the next transition to occur.

Once the next transition occurred, its timing is stored in CURR. The current pulse time, TC, is calculated as the difference between the two detected edges. From the previous pulse width, TP, the expected pulse width, TE, is calculated. TE is set to 75% of the PREV pulse width, TP.

The value of the current pulse width, TC, is compared with the value of the expected pulse width, TE. If the current pulse width, TC, is greater than the expected time, TE, a ZERO bit is detected. Then it checks to see if FORCE is set to one, if answer is yes, a transition is forced to the output and FORCE is set to zero. The pulse width for ZERO bit, TZ, is set equal to the current pulse width, TC. The previous pulse width, PREV, is updated to the current pulse width, CURR.

Otherwise, if the current pulse width, TC, is less than the expected time, TE, a ONE bit is detected. It checks the value of flag called SKIP. If SKIP is equal to one, it updates the PREV by setting it equal to the current pulse width, CURR, and calculates the new ZERO bit pulse width, TP=2*TC, and sets the value of SKIP equal to zero and checks the value of the counter to see if write process is over or it should wait to detect another transition.

If SKIP value is equal to zero, it checks FORCE to see if a transition should be forced. If yes, it forces a transition and resets the FORCE to zero. It calculates the value for ZERO as bit TZ=2*TC and set, PREV=CURR, and sets SKIP equal to one. Next, the value of write-data (N) is checked. If it is equal to zero, the time of a transition is scheduled when the main time of micro controller reaches to the time equal to the sum of CURR and the ZERO bit pulse width. Otherwise, the time of a transition is scheduled when the main time of the microcontroller reaches to the time equal to the sum of CURR and the ZERO bit pulse width divided by two. It sets the value of FORCE equal to one. The counter's value is decreased by one to take into account that one more bit is written. If the counter value is not equal to zero, it waits to detect another transition otherwise the write process is over.

Although dedicated controllers, including microprocessors and other specialized controllers, are used in disk-drive controllers and related devices, this invention describes the use of a general purpose microcontroller for magnetic card applications. Generally, magnetic card readers use synchronous digital logic circuits. The data must be processed as the information is read from the card in real time. This limits the card reader's ability to process the data in depth for error and security check. An advantage of the present invention is that by using the microcontroller, the data can be processed after the information is read from the card.

Another advantage is that the use of the microcontroller allows less complicated electronic hardware, simplifies magneto resistive (MR) read/write head structure, and it provides an easy method to manipulate the data after it is read from the card. It also increases the reliability of the control system by reducing the number of electronic components. The microcontroller allows the implementation of efficient algorithms for decoding/encoding information along with security codes, and error detection schemes. The invented controller unit will be suitable for multi-track magnetic media with different bit density on each track.

Yet another advantage is that the entire read/write process will be accomplished by using microcontrollers rather than by digital logic gates and discrete components. This will increase the reliability of the system and it will lower the cost of the system.

Still yet another advantage is that the reading, processing, writing, and encryption/decryption of data is done by software rather than by a sequential logic decoding circuitry. Hence, it offers more flexibility and reliability, and lowers the cost in system implementation. The execution of the transactions can be handled by the same microcontroller.

Another advantage is that the thin film MR read/write heads can be fabricated with multiple of bit length distance between the MR read head and the write head. The novel design reduces cross-talk between the read head and write head.

The novel invention herein described takes advantage of the development in integrated circuits microcontrollers, and the development in hard disk technology namely magnetoresistive read heads. Microprocessors and microcontrollers with high speed are readily available and magnetoresistive heads provide more signal than inductive heads. The MR head signal is independent of the speed of the swipe/insertion and is independent of the direction of the swipe/insertion. This unique feature of the MR head makes it the ideal head for the magnetic card applications where the speed/direction of the swipe/insertion can vary.

An object of this invention is to provide a stand alone reader system for magnetic stripes. Another object of this invention is to provide the design of a stand alone reader/writer system for credit card and debit card applications. Yet another object of this invention is to use microcontroller/microprocessor chips to perform reading from the magnetic stripe cards and writing into the magnetic stripe card.

Another object of this invention is to provide a method for reading and writing while the speed of insertion or the swipe of the card varies with time. Still yet another object is to provide in the preferred embodiment a minimum of two bit cell distance between read head and the write head. Another object is to prevent data shifting on the track while the debit card is used. These and many other objects will become apparent with a reading of the detailed description of the preferred embodiments.

BRIEF DESCRIPTION OF THE DRAWINGS

FIG. 14 is an illustration of the mask for the horizontal bias for the process of fabricating the read/write head of the present invention.

FIG. 15 is a continuation of the illustration of FIG. 14 depicting the MR/SAL layer.

FIG. 16 is a continuation of the illustration of FIG. 15 depicting the MR cover layer.

DETAILED DESCRIPTION OF THE PREFERRED EMBODIMENTS

Figure 1:
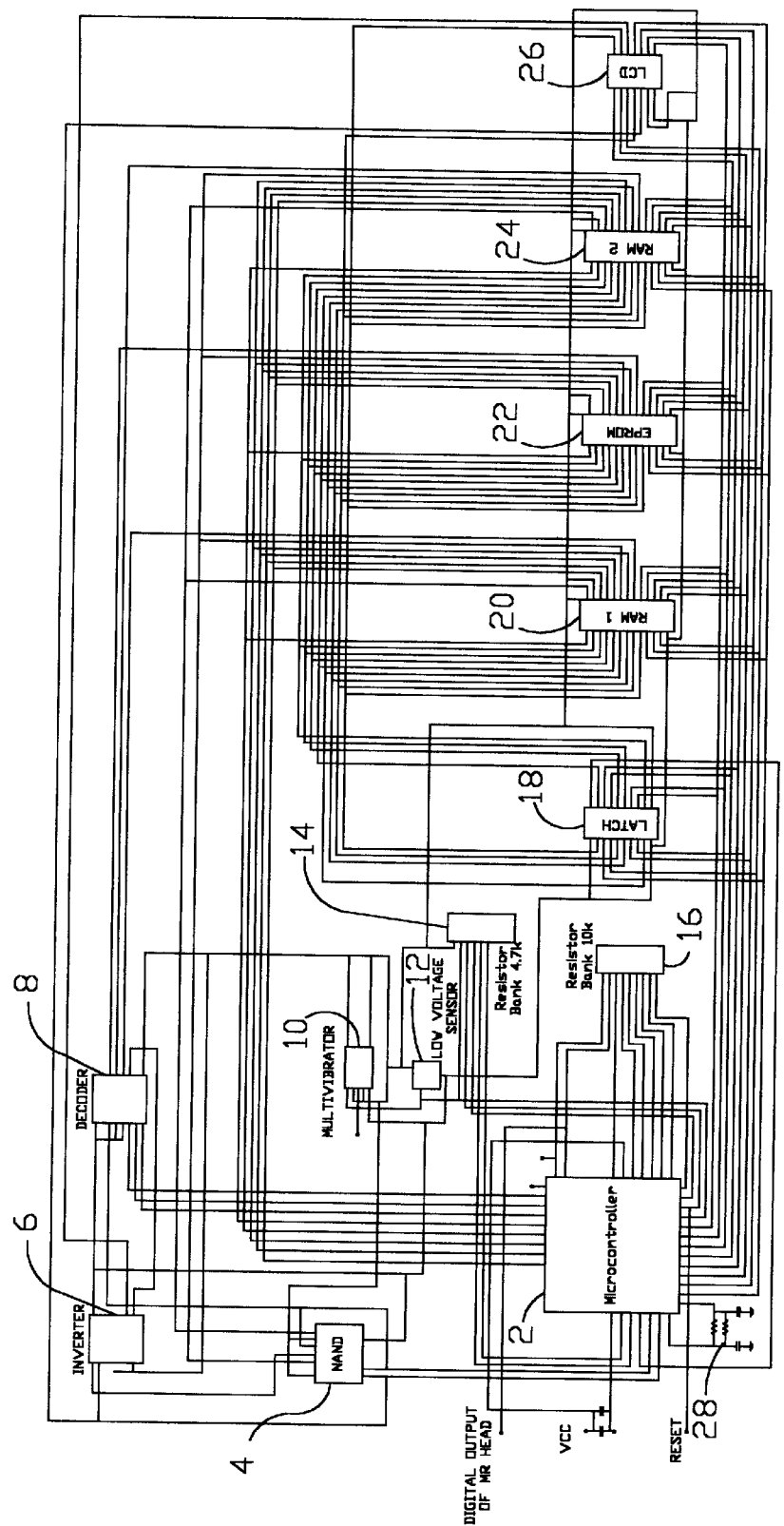
FIG. 1 is a diagram of the external circuitry.

FIG. 1 is a schematic of the card reader circuitry. Proper circuitry means for implementing a microcontroller chip 2, which is commercially available from Motorola under the parts number MC68HC 11E2, for reading and writing process of magnetic card media is disclosed (it should be noted that newer versions of MC68HC111 are compatible with the system disclosed). The microcontroller 2 is an 8-bit microcontroller that offers many features including the input capture ports. These ports are used to store data read from the card.

The microcontroller 2 is electrically connected to the Nand gate 4, which is commercially available from National Semiconductor Inc. under the parts number SN 7410. An inverter 6 is included and electrically connected to the Nand gate 4, with the inverter being commercially available from National Semiconductor Inc. under the parts number DN 7404. A decoder 8, which is commercially available from National Semiconductor Inc. under the parts number SN 74LS138 is also provided. A multivibrator 10, which is commercially available from National Semiconductor Inc. under the parts number SN 74121, is electrically connected to the inverter 6. The multivibrator 10 is electrically connected to the low voltage sensor 12 which is commercially available from Motorola under the parts number MC 34064, which in turn is electrically connected to the resistor bank 14 (which is a 4.7 k resistor bank) and in turn to the resistor bank 16 (which is a 10 k resistor bank).

Additionally, a latch 18 is provided that is operatively and electrically connected to the microprocessor 2, which is commercially available from National Semiconductor Inc. under the parts number SN 74 LS 373. A random access memory 20 is provided that is operatively and electrically connected to the microprocessor 2, which is commercially available from National Semiconductor Inc. An electrically erasable read only memory 22 is provided that is operatively and electrically connected to the microprocessor 2, which is commercially available from National Semiconductor Inc. Further, the random access memory 24 is provided that is operatively and electrically connected to the microprocessor 2, which is commercially available from National Semiconductor Inc. A liquid crystal display 14 pin connection integrated circuit chip 26 is provided that is also operatively and electrically connected to the microprocessor 2, which is commercially available. Finally, a crystal 28 is provided that is operatively and electrically connected to the microprocessor 2, which is also commercially available.

The basic operation of this design is to allow the user to insert a plastic card that contains information stored in a magnetic stripe on the back side into a card reader while reading the information and storing the data into the memory. Once the insertion is complete, the data will be processed by the microcontroller 2 and then desired information can be displayed on a LCD. The time of data processing and decision making will be completely transparent to the users. Based on the particular application, the updated information is written back to the card. The speed of the microcontroller 2 is fast enough to read three tracks contained on the card simultaneously while the card is being inserted in, and write into the three tracks simultaneously during the time that the card is being pulled out.

The microcontroller 2 used in the preferred embodiment can operate in different modes. The modes include single chip, expanded, bootstrap, and special test modes. The micro controller implemented in this design has a memory map from 0000h to FFFFh. The first 256 bytes in all modes are RAM. There is also a 64 byte register block in the range 1000h to 103Fh. The final 2 k bytes are EEPROM, with the final part of this range FFC0h to FFFFh being Normal Modes Interrupt vectors.

In the preferred embodiment, it will be necessary to store at least 16 k bytes of data in RAM. This far exceeds the 256 bytes available on the chip. Therefore, it is necessary to use the expanded mode of operation. The expanded mode allows the external chips to be addressed in the remaining ranges of 0100h-0FFFh and 1040h. This provides over 50 k bytes of external addressing available.

In order for the program to execute, it is necessary to initialize the program counter. In the preferred embodiment of the present memory map, for this design, the executable code is stored in the EEPROM address range at 8000h. The location of the initial program counter is FFFEh and FFFFh. The high order bit 80h is stored in FFFEh while the low order bit 00h is stored at location FFFFh.

In operation, when power is applied, a message INSERT CARD will appear on the LCD. The microcontroller 2 is continually polling the input capture pins for an event to occur. As the card is inserted into the card reader, it passes underneath a magnetoresistive (MR) head. The information on the card is stored in the form of magnetic flux reversals. As the card moves under the head, the resistance is detected by the head changes. The generated signal is in the range of a few hundred micro-volts to millivolts analog signal.

The analog signal needs to be in the form of a digital square wave for the microcontroller 2 to process it. A section below describes the process by which the waveform is conditioned from analog to digital. After the waveform from the card is amplified to a value of about 4 volts and is conditioned into a square wave, the time at which transitions of the wave occurs is stored into the micro controller 2 by means of the input capture ports PA2/IC1 [32], PA 1/IC2 [33], and PA0/IC3 [34]. This is the largest amount of data that is required to be stored in external RAM 20, 24. These time edges will then be processed and the particular rising or falling edge data will be stored in the external RAM (20, 24). The binary information will then be extracted from the edges and stored in the RAM 20.

For all three tracks to be processed, it will be necessary to interface 16 k bytes of external RAM 20. Two 8k×8 bit RAM chips (20, 24) will be implemented with the microcontroller. The locations of these chips are for RAM-20 is 4000h-5FFFh. For RAM-24, the location is 6000h-7FFFh.

In addition to the external RAM 20, 24, it will be necessary to add external EEPROM (22) to store the executable program. The code for all three tracks exceed the 2 k bytes available on the chip. The 8 k×8 bit external EEPROM 22 will be mapped at locations 8000h-9FFFh. This allows for all three tracks from the card to be read and processed virtually simultaneously.

As the system waits for input captures, it continually checks the interrupt request (IRQ) pin [19] of the microcontroller which will be sent low to determine if the end of the card has been reached. This is implemented either with optical sensors that will be mounted in the rear of the card reader or with a micro-switch that provides a low pulse when the card hits the back of the card reader. When the end of the card is reached, the active low IRQ pin 19 will be sent a low signal from the card reading device. When the system detects this, it enters the Interrupt Service Subroutine. The microcontroller 2 then goes to location FFF2h (high order bit) and FFF3h (low order bit) to retrieve the Interrupt Vector. This value will depend on the code being used. The interrupt subroutine will also be stored in the 8K of EEPROM 22. The current location of the subroutine is 9FF0h.

The 256 bytes of internal RAM, which is part of the microcontroller, will be used by the program for variables. Currently, the program locates the top of the stack to the end of this range of 00FFh. It is possible to have the stack moved to the end of the external 16k bytes of RAM 20, 24. The location of the stack pointer is determined by the program and can be manipulated with ease. The stack pointer is initialized at the beginning of each program.

As shown in FIG. 1, the microcontroller 2 is connected as required to be in Expanded Mode. This is resolved by MODA and MODB (pins on the microcontroller 2) being tied high through 4.7 k ohm resistors at power up. There are bypass capacitors connected between Vdd and Vss to filter noise. An 8 MHZ crystal is used to provide a bus speed of 2 MHZ. A low-voltage sensor is an integral part of the circuit because it enables the microcontroller 2 to properly turn itself off when the voltage falls below the rated value of the chip. The analog to digital converters are not used in this design and are therefore not connected. The pins on Port E of the microcontroller 2 are not utilized in the preferred embodiment; therefore, they remain unconnected. The input captures IC [1, 2 or 3] are located on Port A. The pins of Port A of the microcontroller 2 is directly interfaced to the card reading circuit.

The data bus and low order address bus share the same bus. On the first half of the clock cycle, the bus contains the low order address and on the second half of the clock cycle, the bus contains the data. Therefore, it is necessary to latch the address through the latch 18. The low order addresses can now be combined with the high order addresses to provide complete addressing capabilities. Port D pins of the microcontroller 2 are tied high through 10 k resistors along with some of the Port A pins which is detailed by FIG. 1. AS, R/W, and E serve as the control bus to enable the external chips. The decoder 8 is a three to eight bit decoder that allows the highest 3 bits of the address bus to enable the particular RAM (20 or 24) or EEPROM chip 22 needed. The other chips are NAND gates 4 and an INVERTER gates 6 used to allow decoding of the control lines as needed. The detailed pin-outs of these chips are specified in data sheets commercially available for each chip used.

The LCD 26 is interfaced to the microcontroller 2 as external RAM 20, 24. In the preferred embodiment, the memory address location is 2000h and 2001h. The data bus is interfaced to the LCD 26 to provide the information to be displayed and provides a means for the program to check to see if the LCD 26 is in a busy state. When the LCD 26 is in the busy state, no information can be sent to the LCD 26. The LCD 26 requires a potentiometer to divide the voltage so the LCD 26 display brightness can be controlled. The control signals come from the microcontroller's control signals and the A0 of the address bus.

In the preferred embodiment, when power is applied to the system, a message INSERT CARD will appear on the LCD. As noted earlier, the microcontroller 2 continually poles the input capture pins IC [1, 2 or 3] for an event to occur. As the card is inserted into the card reader, each track passes underneath a MR head. The information on a track is stored in the form of magnetic flux reversals. As the card moves under the MR head, the resistance detected by the head changes and is in the form of a sine wave in the range of a few hundred micro-volts to millivolts. This analog wave needs to be in the form of a digital square wave for the microcontroller 2 to process it.

Figure 23:
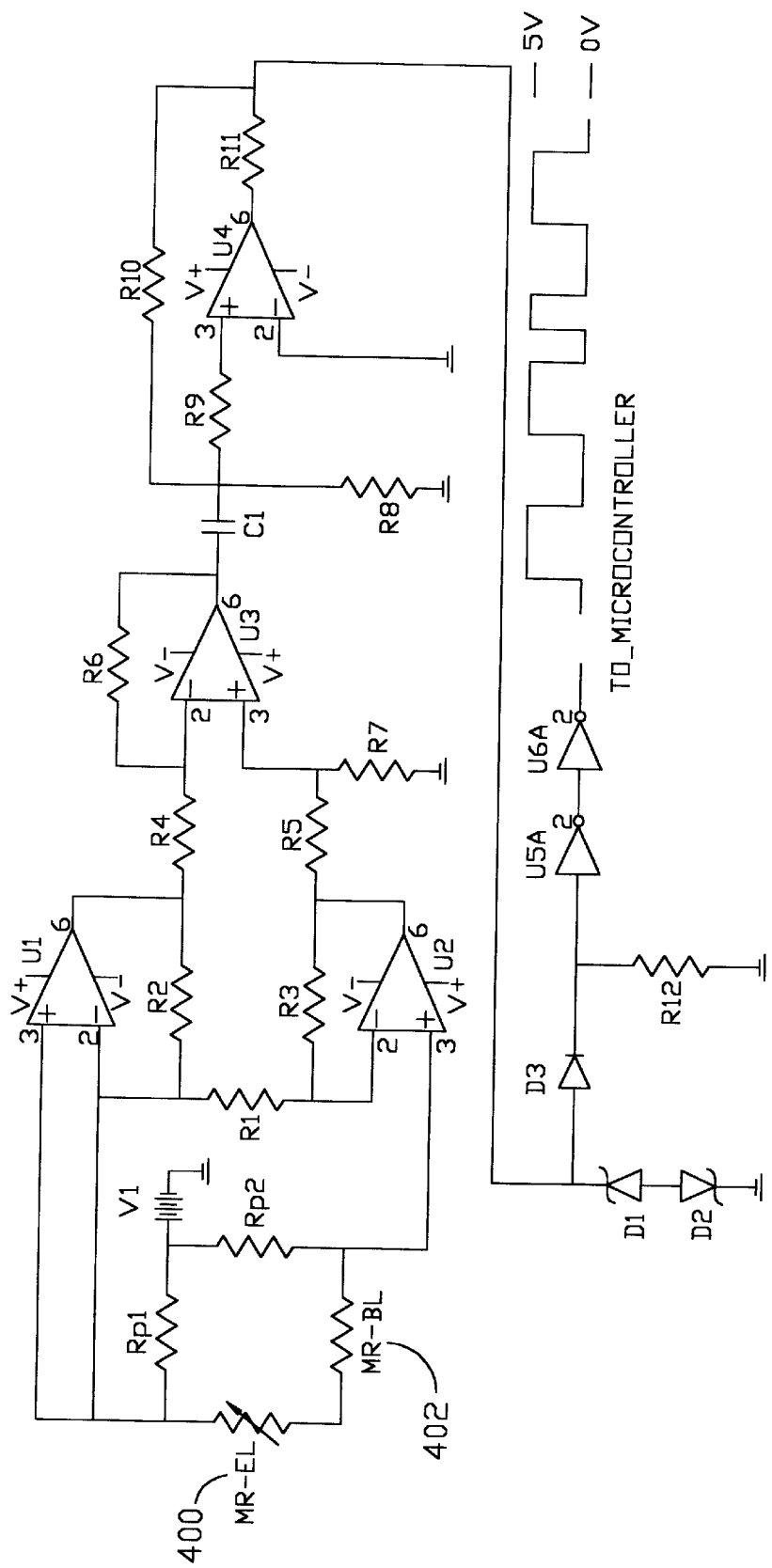
FIG. 23 is a diagram of the amplifier and analog to digital converter circuit of the preferred embodiment.

The signal conditioning circuit amplifies this signal in a two stage process. Reference is made to FIG. 23. Each stage currently amplifies the signal by 15V/V through operational amplifiers. The gain for each stage is determined by the resistors associated with that stage. In the most preferred embodiment, two stages are used as opposed to a single stage gain to achieve a higher component of high frequency cutoff. After the signal goes through the amplification (gain of 800–1000), it is in the form of a +5V to −5V analog signal. The signal finally passes through a schmitt trigger and a diode. The schmitt trigger, which is made by using an operational amplifier, throws the signal to the rails of the power supply making the signal +5V to −5V digital signal. The diode cuts off the 0 to −5V part of the signal. Now the signal is in the form necessary to be used by the microcontroller 2. FIG. 23 will be described in greater detail later in the application.

Anisotropic magnetoresistive thin film sensors (which are referred to as MR read heads in this application) are used in a variety of applications such as disk and tape storage devices, and recently for magnetic stripe cards. MR heads were first put into production by International Business Machines, Inc. (IBM), and all IBM drives have used MR heads since 1991. The thin film head structure consists of an MR read element integrated with an inductive write element. Once the MR element is exposed to a magnetic field of 5 Oe, its resistance changes by about 2.5%. In contrast to inductive heads, MR detects the magnetic field directly, hence sensitivity is independent of swiping velocity. The change in the resistance is detected by an electronic circuit, and a corresponding signal indicating the change in magnetic field is generated. The detected signal is amplified and the amplified analog signal is converted to a digital signal. The digital signal will consist of the data that is read from the magnetic storage media.

In this application, the microcontroller 2 is used to control and process the data. In this scheme, three tracks of data are read simultaneously and after processing, the data is written back to the magnetic media. The microcontroller 2 is used to efficiently control all of the associated hardware to accomplish the task of reading, writing and processing.

Figure 2:
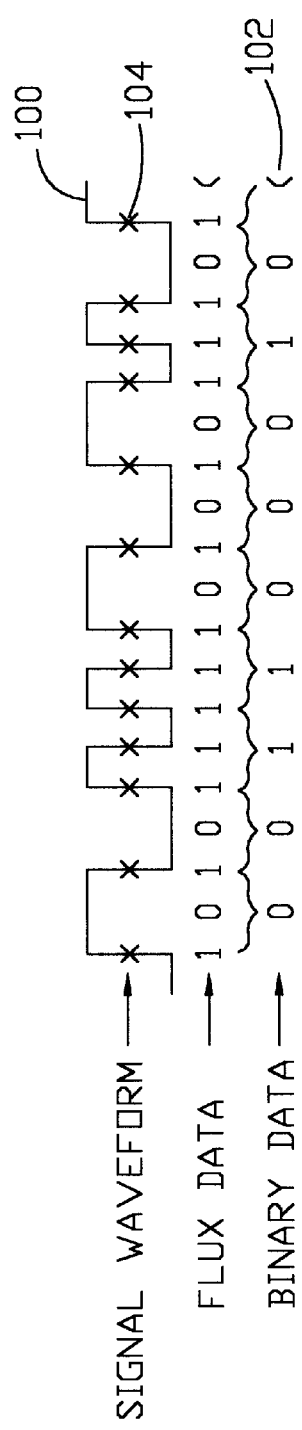
FIG. 2 is a diagram of a typical signal waveform and binary data derived therefrom.

The coding format of the present invention will now be described. As those of ordinary skill in the art will recognize, each type of storage media has its own coding format. The code on the magnetic stripe of the card is in the form of magnetic flux reversals, which are reversals in orientation of the magnetic material on the card, compatible with ISO/IEC (CD 7811-6) standards, which is incorporated herein by express reference thereto. The MR sensor can detect each flux reversal accurately and signal the micro controller 2. FIG. 2 is a diagram of a typical signal waveform and binary data derived therefrom. As seen in FIG. 2, three flux reversals in a row signify the digit 1 of the data, and two flux reversals with one missing in the middle signifies the digit 0.

The magnetic card consists of three tracks which are formatted in different ways. Track 1 has a bit density of about 210 bits per inch and is formatted into 7 bit characters, where the most significant bit is the odd parity bit. Track 2 has a bit density of 75 bits per inch, whereas Track 3 has a bit density of 210 bits per inch. There are a number of leading and following clocking transitions before and after the actual data on the magnetic stripe. In other words, there are several clocking transitions before the data which enable the card reader to achieve bit synchronization before the start sentinel actually begins. In addition, after the end sentinel there are several clocking transitions which significantly decrease the complexity of the decoding method, as will be discussed later. Generally, on a full track, at least 20 clocking transitions are before the start sentinel and at least 20 clocking transitions follow the Longitudinal Redundancy Check "LRC" character, which is immediately after the end sentinel, and is used for error detection. The LRC character appears for each data track. The LRC character is encoded so that it immediately follows the end sentinel when the card is read in a direction giving the start sentinel first, followed by data and the end sentinel.

The method used to implement reading and writing from/to a magnetic card consists of three stages: I) read stage; II) process tracks; III) write. The process taken in these steps will now be described. It should be noted that the steps were implemented on the micro controller 2.

As noted earlier, FIG. 2 is a diagram of a typical signal waveform and binary data derived therefrom. The output signal from the card reader circuitry is in the form of a diphase wave, where the data is extracted based on whether or not a flux reversal occurs between clocking transitions. FIG. 2 depicts a segment of a typical waveform 100 produced by the card reader circuitry, along with the decoded binary information 102. The waveform 100 shown consists of a series of rising and falling edges which will be referred to as flux reversals. The transitions marked with an 'x', which will be referred to as clocking transitions 104, are evenly spaced on the card, and the information is extracted based on whether or not a flux reversal occurs between clocking transitions.

However, in a non-motorized magnetic stripe card reader the pulse width of the signal will change according to the speed of swiping. This process, therefore, assumes that the time between clocking transitions when swiped manually is fairly constant for adjacent transitions. As shown in FIG. 2, if no flux reversal occurs between clocking transitions, the bit is a 0, and if a flux reversal does occur between the clocking transitions, a 1 is decoded. In the process disclosed, there are several intermediate steps that must be taken to decode the information into the desired format.

Since a signal is being read on three tracks simultaneously, the microcontroller's 2 speed limitations force us to store the time of each flux reversal in memory, so that the information can be processed after all three tracks have been swiped, instead of processing the information while the card is being read. Because of this, a fixed amount of memory is needed to store the times (generally, less than 8 k bytes, based on 420 flux reversals per inch on two tracks and 150 flux reversals per inch on one track with track length of 3.25 inches).

Recording the times is accomplished by using the input capture feature of the microcontroller 2. The process requires that the program simply wait in a loop until an edge has been detected on any of the three tracks, and upon detection of either a rising or a falling edge, the time is stored in the memory array corresponding to the appropriate track.

After the card is swiped, an optical sensor at the back of the card reader will be triggered when the entire track has been read. The optical sensor will trigger the microcontroller 2 to exit the read stage and enter the processing state of the process. The card holder will be asked to swipe again or pull out the card for writing on the card. The transaction will not be granted until the data is written on the card.

Figure 3:
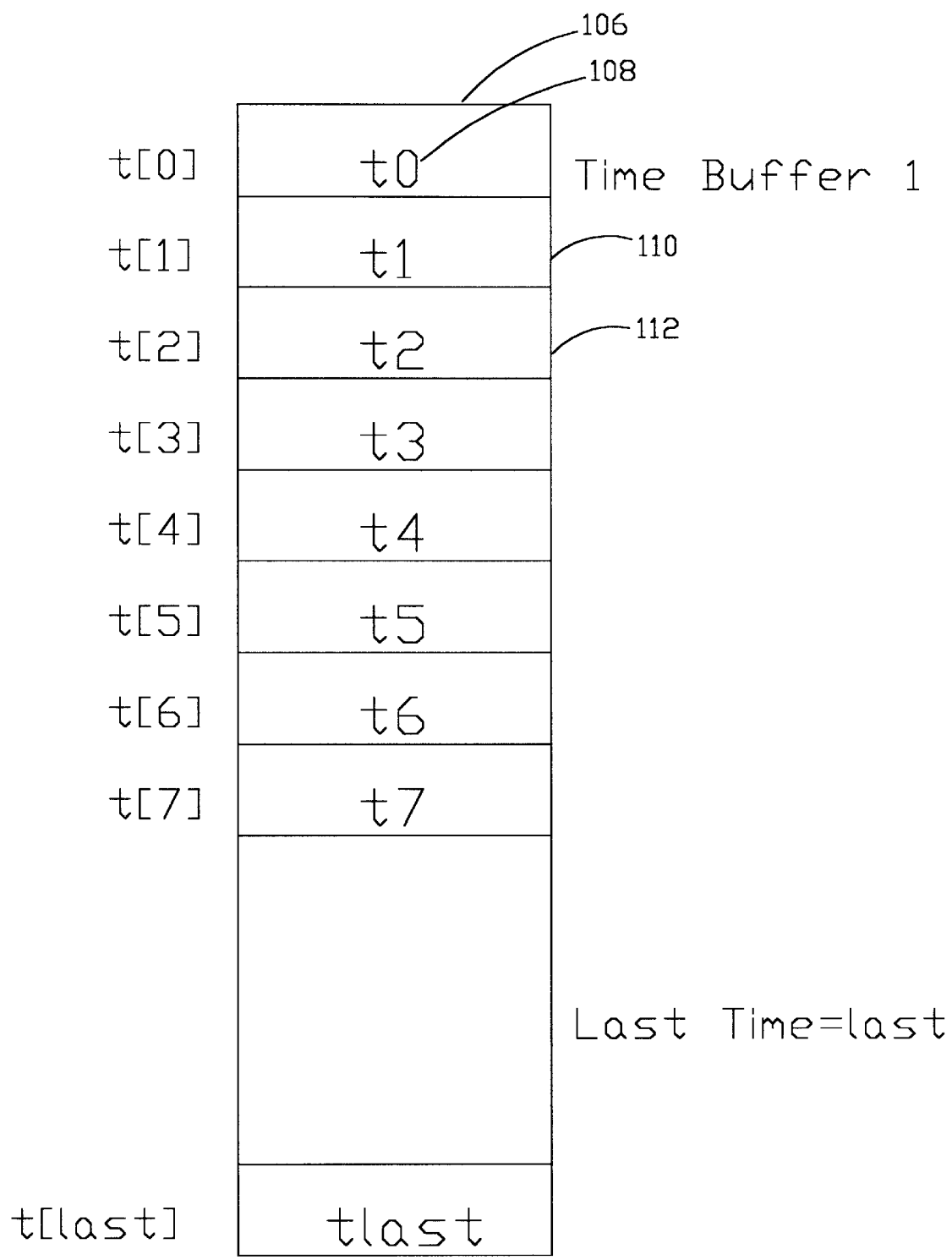
FIG. 3 is a diagram of the time transition data being recorded in a memory array.

FIG. 3 is a diagram of the time transition data being recorded in a memory array. As shown in FIG. 3, upon exit from this loop, the time buffer 106 will store each of the edges, or time data 108, and a counter (not shown) holds the value corresponding to the last memory location storing a valid time. Thus, time buffer 106 holds time data t0; time buffer 110 holds time data t1; time buffer 112 holds time data t2; and so on.

The processing stage consists of three steps, where the data is transformed from time data into flux data, and then from flux data to binary data. Then, once the binary data is decoded, the data is checked for errors.

Figure 4:
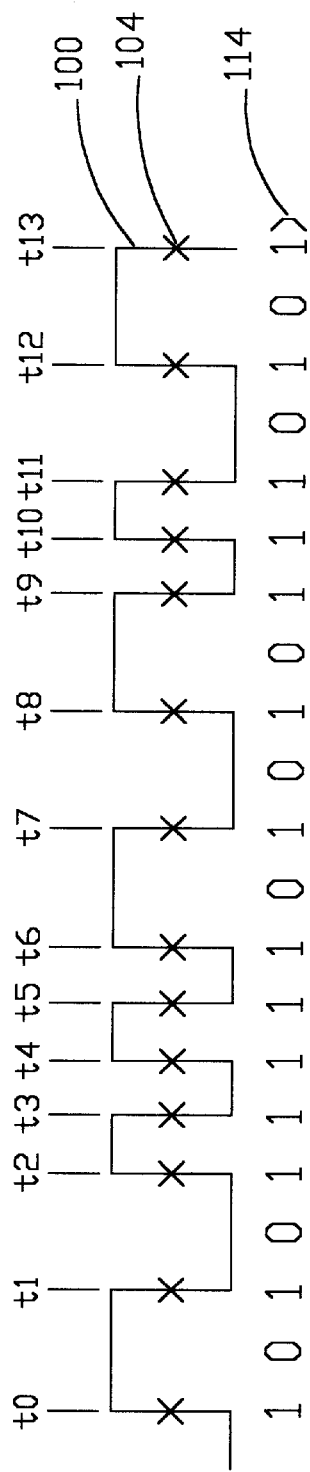
FIG. 4 is a diagram of the wave form and flux data from FIG. 2.

The goal of the time data to flux data stage of the process is to record a 1 for every flux reversal and a 0 for a missing flux reversal. FIG. 4 is a diagram of the wave form and flux data from FIG. 2. It should be noted that like numbers refer to like components in the various figures. Therefore, the wave 100 shown earlier in FIG. 2 is redrawn in FIG. 4, with the desired information shown beneath the wave I. e. the representative binary data 114. The method used to extract this information is based on the pulse width time between clocking transitions. This time is easily found, knowing that for every signal, the first incoming pulse is always a 0, that is, the pulse is a 101 combination. 101 is then stored in memory before entry into the loop. Since the first signal is a 101 combination, Pulse Width 1 is calculated as t1-t0. Once this time is known, an expected time is computed as ¾ of the pulse width between clocking transitions.

FIG. 5a is a diagram of a pulse width being greater than an expected time. FIG. 5a depicts a signal wave form 116 along with clocking transitions 118a, 118b, 118c (denoted by the X). FIG. 5a further illustrates the first pulse width 120 and a second pulse width 122 and an expected time pulse width 124. FIG. 5b is a diagram of a pulse width being less than an expected time. As shown in FIG. 5a, if the pulse width 122 of the current signal under examination is greater than the expected time, then it is known that there is a missing flux reversal between the clocking transitions. Thus, a 01 combination is stored in memory at flux buffer 128 (shown in FIG. 6).

The flux transitions 118d, 118e, 118f and 118g are shown in FIG. 5b. Pulse width 126 is found to be less than the expected time. In this case only a 1 would be stored, corresponding to the flux reversal 118f between clocking transitions. When the next pulse is measured, this pulse would also be less than the expected time due to the flux reversal 118g and another 1 would be stored, corresponding to the clocking transition.

Therefore, for a valid signal, where the adjacent clocking transitions are almost equally spaced, two flux bits will always be stored in memory for every clocking transition. In other words, referring to FIGS. 5a and 5b, a 01 is stored for a missing flux reversal/clocking transition combination, and a 11 is stored for a flux reversal/clocking transition combination. The first bit shifted into memory corresponds to the actual data, while the second bit shifted in is always a 1, which corresponds to the clocking transition.

Figure 6:
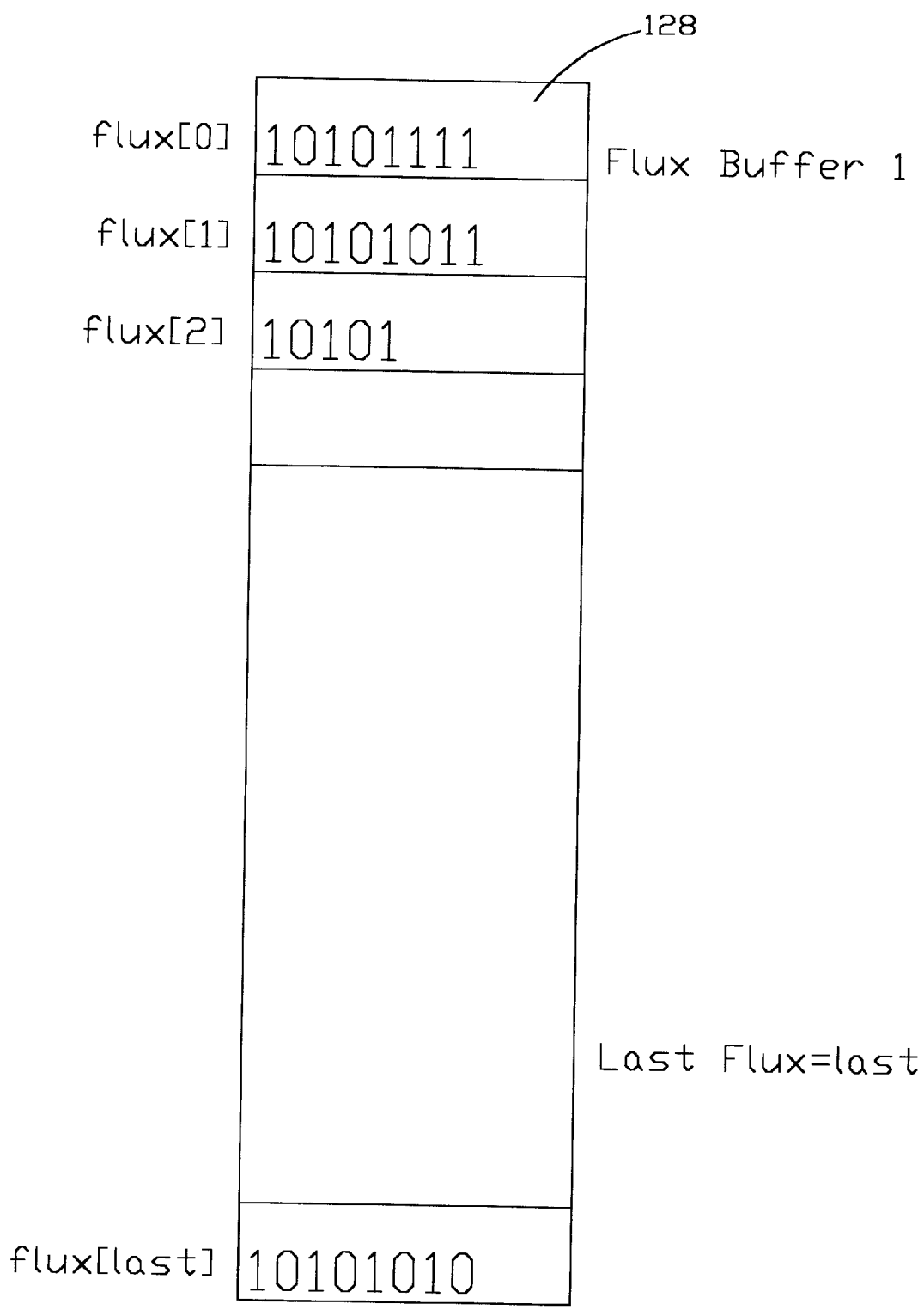
FIG. 6 is a diagram of the flux data being stored in a memory array.

The previous explanation only accounts for the pulse after the first 101 combination. However, the entire wave on track 1 is easily decoded by simply proceeding through the array held at time buffer 106, and computing the next pulse width as Ti-Ti-1 and comparing this value to the expected time. FIG. 6 is a diagram of the flux data being stored in a memory array. Once again, if pulse width 122 is greater than the expected time 124, 01 is shifted into memory at flux buffer 128 (shown in FIG. 6), and if pulse width 122 is less than the expected time, a 1 is shifted into memory.

For the signal shown, the expected time is almost constant, which does not vary significantly since the clocking transitions are assumed to be equally spaced in time. However, the card will be manually swept and therefore the speed of the swipe will not be constant. Because of this, the expected time is recomputed every time a 01 combination is found. However, it is possible to have an embodiment that recomputes the expected time based on a 11 combination if it is found that the expected time should be computed at every pulse.

Figure 5:
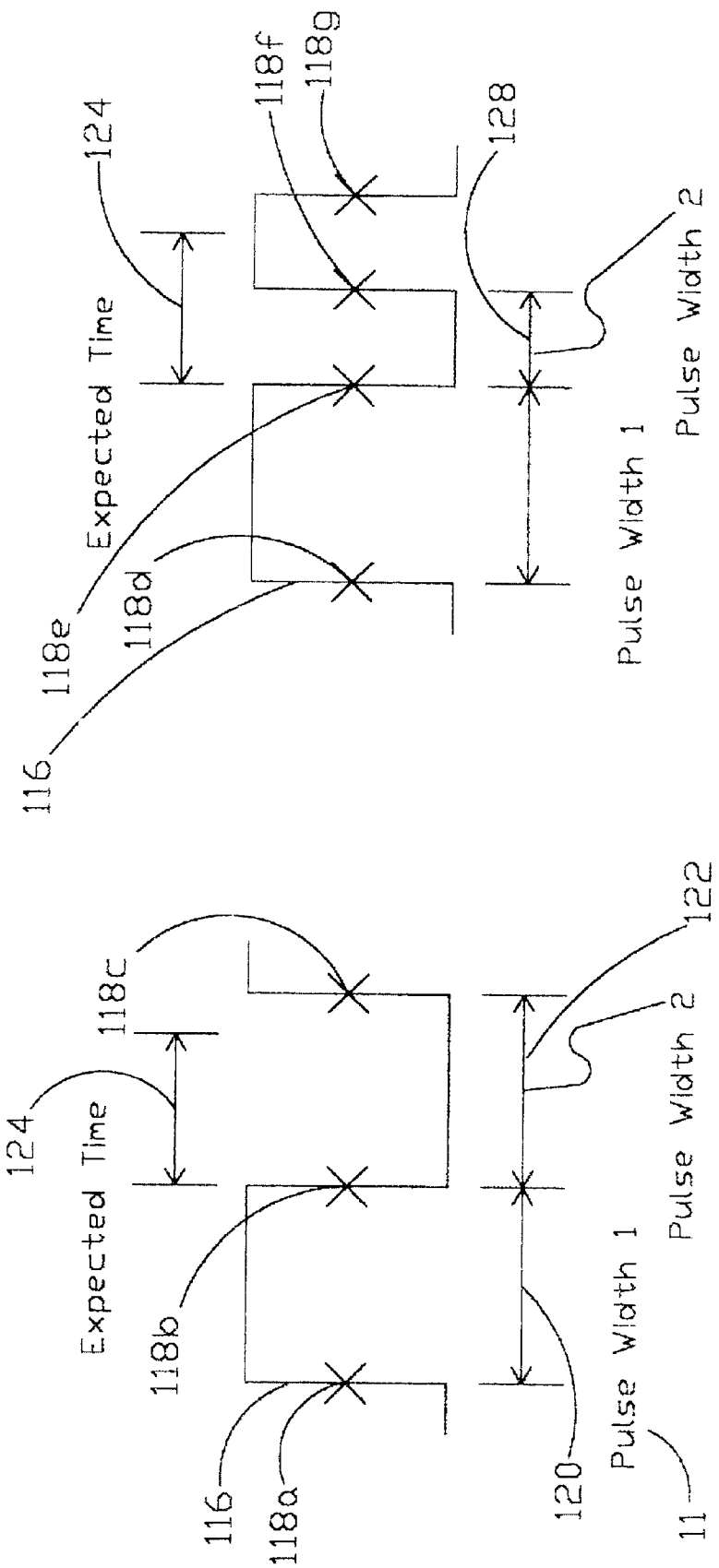
FIG. 5a is a diagram of a pulse width being less than an expected time.
FIG. 5b is a diagram of a pulse width being greater than an expected time.

As noted above, FIG. 6 shows the memory array held at Flux Buffer 128 which is based on the waveform 116 shown in FIG. 5. A very important aspect of this array is that if no errors have occurred, every $1^{st}$, $3^{rd}$, $5^{th}$, and $7^{th}$ bit should hold a 1, which is from the clocking transitions, and every $0^{th}$, $2^{nd}$, $4^{th}$, and $6^{th}$ bit holds the binary data. Also, using this algorithm, every data signal must end with a sequence of at least ten zeroes, that is 01 combinations. If the 01 combinations are at the end of the signal, the data held at the last flux buffer is irrelevant and need not be processed in the next section. This is important because there is no guarantee that this byte will be full and extra care must be taken if this data were valid.

Next, the binary data will be generated from the flux data. The goal of this portion of the process is to extract the binary information from the data held at the flux buffer (128 et seq). This is accomplished first by shifting data held at flux buffer 128 once to the left, checking the carry bit and shifting the data left again, till a 1 is held in the carry flag. This is done to get rid of the leading zeroes that are always held on the card. When a 1 is held on the carry flag bit, the actual data has begun, since the start character always starts with a one as the least significant bit. In order to add an extra measure of safety, the data will be shifted so that every odd bit is shifted right into the ones buffer (134 of FIG. 8, ones buffer), and every even bit is shifted right into the binary buffer (of FIG. 7, 130). Care must also be taken to ensure that the correct number of bits are rotated into both the binary buffer 130 and the ones buffer 134, since Track 1 data consists of 7 bit characters and Tracks 2 and 3 consist of 5 bit characters, including a parity bit for all tracks. Thus, it is possible to use a counter to increment the binary buffer array 130 so that when a character is full, the next byte in the array is used.

Figure 7:
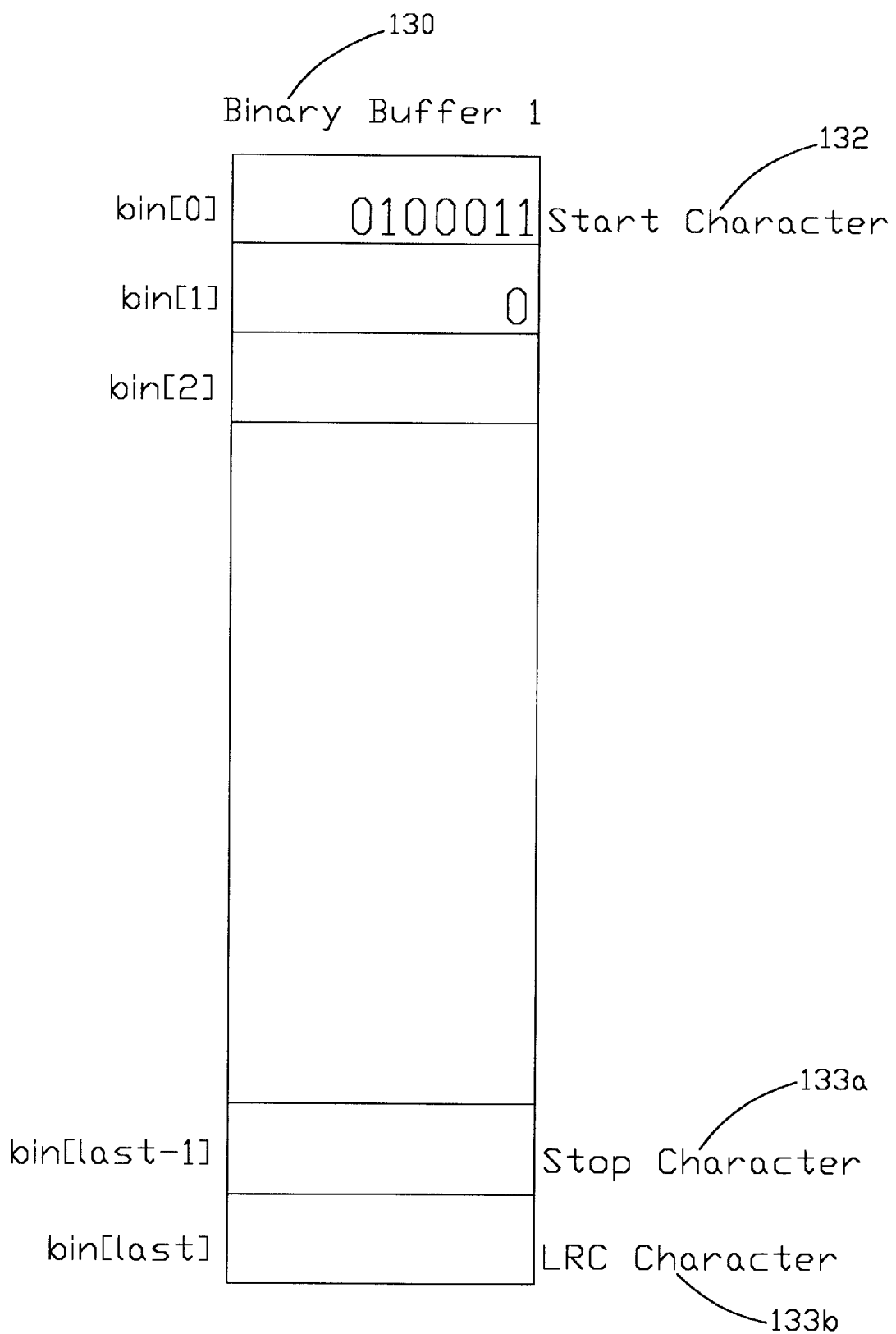
FIG. 7 is a diagram of the binary buffer with the start sentinel and data characters stored therein.

FIG. 7 is a diagram of the binary buffer 130 with the start sentinel 132 (with data characters 0100011 contained therein) and the other binary data stored within the binary buffer 130. Upon exit from this routine, the data will be held in the memory array at binary buffer 130, as shown in FIG. 7. Also note that the data is shifted to the right, since on the incoming signal, the least significant bit of every character is first. If no errors have occurred, the binary data contained within the binary buffer 130 will consist of a start character, followed by the data and concluding with a End Sentinel 133a and a Longitudinal Redundancy Check (LRC) Character 133b. Also, the ones buffer 134 should contain all ones, as will be explained below.

Figure 8:
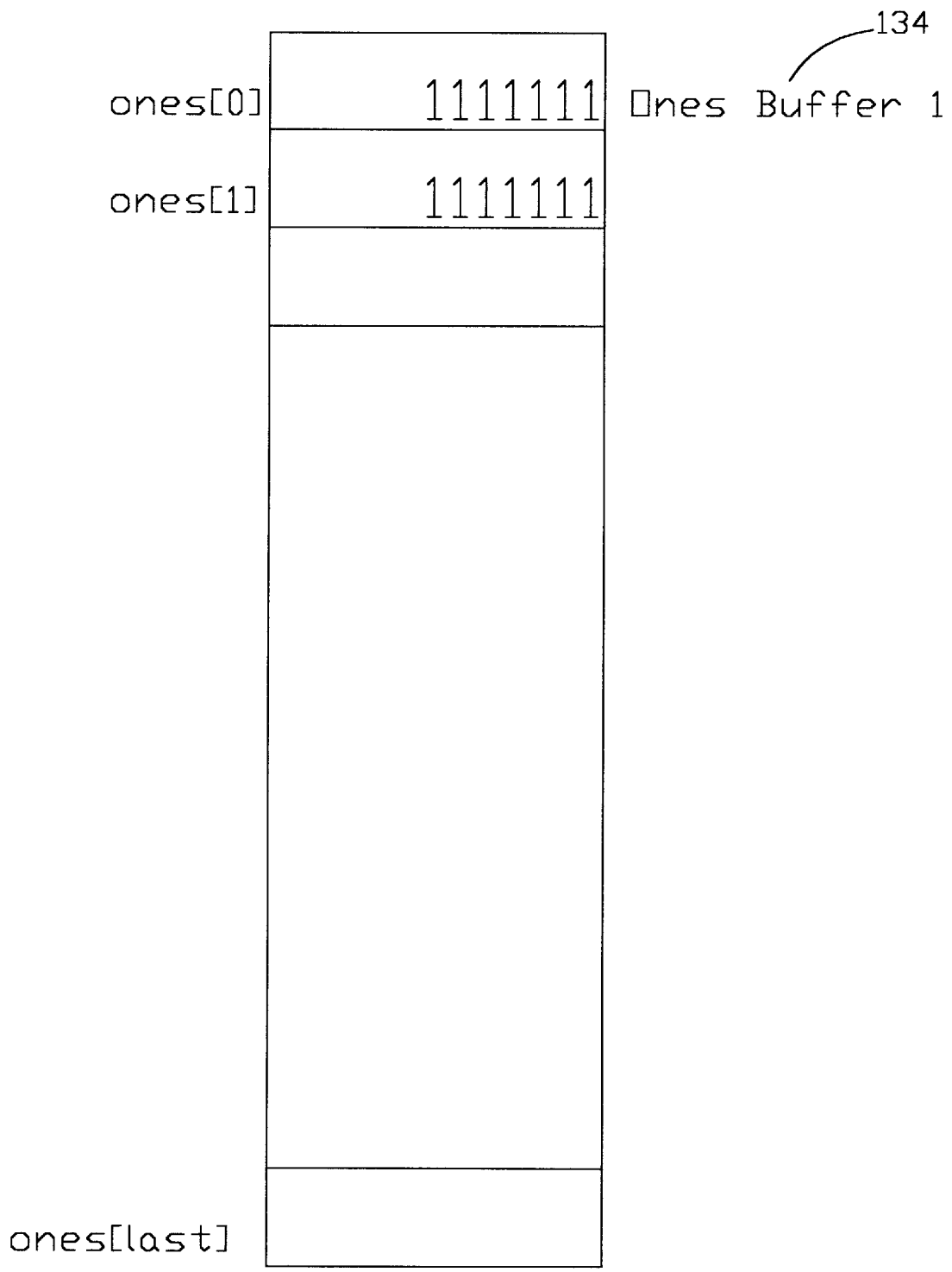
FIG. 8 is a diagram of the ones buffer which will be checked during the error detection stage.

The error checks used in this process correspond to those set by the ISO/IEC CD 7811 Standard, which include a parity check for each data character and an LRC check. FIG. 8 is a diagram of the ones buffer 134 which will be checked during the error detection stage. The one's corresponding to the clocking transition are rotated into the ones buffer 134, which will be checked during the error detection stage. The parity is defined to be odd and the LRC check is calculated such that the parity of the corresponding bit location in every character is even, including the Start Sentinel, all Data Characters, End Sentinel and LRC Character. In addition, this process has added an extra error detection feature, which is the Ones Check, where all of the bits in the ones buffer 134 must be a one. Should any error occur, the user would be prompted to reinsert his card for another attempt.

Figure 9:
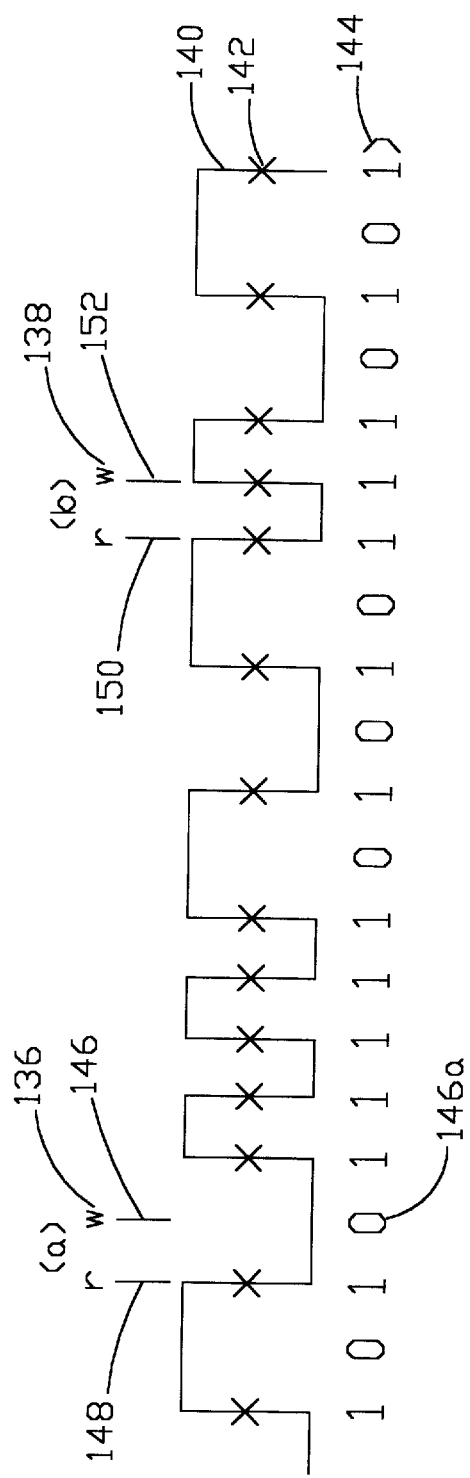
FIG. 9 is a diagram of a wave form and two situations that can occur during the write stage.

In one embodiment, the method used to implement the write stage of the process utilizes two heads placed exactly one half of a clocking transition apart from each other. FIG. 9 shows two sets of read/write heads (136, 138) which are being used to show the two different situations that can occur during the write process.

One important aspect of the write stage is that the entire track must be read while writing and processing, just as done previously, so that the data can be compared to what should have been written. This is done so that errors can be detected.

Using a read and write head that is back-to-back gives us the ability to let the read service routine control the entire process. In other words, when the read head detects the signal that was just written, it will then tell the write head what to do next. FIG. 9 depicts the waveform 140, the x's 142 representing the clocking transitions, along with the binary extracted data 144. In the first scenario 136 shown in the FIG. 9, it can be seen that the next data for the write head 146 to write is a zero (146a), which indicates no change. In this case, when the read head 148 detects the current transition, it must calculate the time for the write head to write the next flux reversal, which must take place automatically, since the read head 148 will not detect any transition at the time that the next flux reversal must be written. As seen in the second scenario 138, when the read head 150 detects the current transition, it knows that the write head 152 must force a transition, therefore it immediately forces a transition on the write head 152.

A major advantage of the microcontroller 2 is its extensive but simple timing system which consist of three input-capture functions with a 16-bit time capture latch for each of them. The input-capture is a feature of the microcontroller 2. The physical time of the microcontroller 2 is represented by the count in the 16-bit free-running counter, which forms the central element in the main timer system of the microcontroller 2. Input-capture functions, used to record the time at which some external event occurred, are accomplished by latching the contents of the free-running counter when a selected edge is detected at the related timer input pin. By recording the times for successive edges on an incoming signal, the method herein described determines the period and/or pulse width of the signal. To measure a period, two successive edges of the same polarity are captured. To measure a pulse width, two alternate polarity edges are captured.

There are limitations imposed by using a microcontroller 2 to read data from three channels of a magnetic card. Since a microcontroller 2 operates at a specific clock speed, in the preferred embodiment 2 MHZ, the microcontroller 2 does not have time to process the data from all three channels as the data is being read in.

An interrupt may be used to notify the microcontroller 2 that an edge has been detected and then the microcontroller 2 can record the time of that event in a memory array. An interrupt scheme could be very useful if the microcontroller needed to monitor other events. However, in this process, the microcontroller 2 is exclusively used for Read/Write purposes; therefore, the microcontroller 2 sits in a loop waiting for an interrupt to occur. It was found that the maximum frequency of flux reversals that could be accurately read on all three channels using interrupt scheme was approximately 8800 flux reversals per second.

In the preferred embodiment, and as an alternative to the interrupt scheme, a polling implementation will be used. The polling method is advantageous mainly because it does not have to spend time pushing and pulling registers from the stack. As mentioned earlier, the microcontroller 2 being used has an input capture feature, which latches the time of a free running clock so that the exact time of a rising or falling edge is known. With the time of all edges known, the time difference between a rising and falling edge can easily be found by subtraction. Therefore, the times of all edges must be stored in memory to be processed at a later time.

Thus, the method herein described loops through three statements, which checks whether an edge has been detected on each of the three channels. Upon detection of an edge, the microcontroller 2 would enter the corresponding subroutine and store the time of the edge in memory.

Upon experimentation with the polling method when reading three tracks, it was found that the maximum frequency of flux reversals was increased to approximately 12000 flux reversals per second using the polling technique, as opposed to only 8800 flux reversals per second for the interrupt method. Since a bit is composed of 2 flux reversals for a 1 (worst case), based on a frequency of 12000 flux reversal/second, which is 6000 bits/second, and an average bit density of 210 bits/inch, a maximum swipe speed of 28.6 inches/second can be achieved.

In experimentation, and according to the ISO/IEC CD 7811-6 Standard, it has been found that due to the speed limitations of the microcontroller 2, which operates at a 2 MHZ bus speed, the maximum swipe speed that the microcontroller 2 can handle with the current program is about 29 inches per second. After experimentation with actually swiping a card, however, it was found that a comfortable swipe was at the rate of about 5 to 8 inches per second, which is well within the limits of the microcontroller 2. Also it was found that a swipe of 15 inches per second was virtually impossible, and if a person is able to swipe the card faster than 29 inches per second, the system could prompt the person to reinsert the card for another attempt.

Despite the results obtained for all three tracks, if the process were implemented using only one track (which is commonly done in many applications), the swipe speed could be tripled, and could therefore easily meet the requirements of 50 inches per second.

Now, based on a desired upper limit of 15 inches per second for the swipe speed, the necessary time between flux reversals is calculated as follows:

min frequency=15 inches/second*420*flxrev*/inch=6300*flxrev*/second or max time=158.7 *us*

If the desired upper limit of 50 inches per second, the time between flux reversals can be calculated as follows:

min frequency=50 inches/second*420 *flxrev*/inch=21000 *flxrev*/second or max time=47.6 *us*

In other words, we have about 159 us to execute three write subroutines along with the pooling loop in order to attain a swipe speed of 15 inches per second on three channels. The polling loop simply detects whether a read has occurred and inside of the read subroutine, the next write must either take place or be programmed to take place (as per the previous write description). However, since the ISO/IEC standard dictates that only track 3 be rewritable, an implementation which would only write on track 3 would have 159 us to execute just one write subroutine for a maximum swipe speed of 15 inches per second, or 48 us to achieve a swipe speed of 50 inches per second.

The speed of the microcontroller is an issue to consider. In calculating the maximum required cycle time, five different paths of actions are taken into account in the read/write algorithm. The longest path occurs for the condition when there is a high frequency data (one) detected and a high frequency data (one) must be written. For this case 204 cycles are required.

If a 2 MHz microcontroller is used, the maximum allowed swiping speed for a 210 bit/inch is 22 20 inch/sec. However if a 16 MHz microcontroller is used the maximum allowed swiping speed is 167 inch/sec. The maximum swiping speed is 50 inch/sec according to the ISO standard.

Therefore a 16 Mhz microcontrollers will be sufficient to read and write into any of the tracks of the magnetic strip card.

As set out below, one embodiment of the program has two totally separate paths of execution, designed by FORCE and CALCOC depending on whether a flux reversal is to be written now (FORCE), or programmed (scheduled) to be written at some future time (CALCOC). Although both paths share some of the same information, they are written separately to save the execution time required for program branches.

Before the preferred methods of processing the data is explained, a brief discussion of the output compare function, which is the other half of the timing system of the microcontroller 2, will be given. In the microcontroller 2, each output compare has a 16 bit register that holds the time for the next output compare action. When the time of the free running clock matches the time in the OC (output compare) register, the action will take place. The programmable options for the actions that can take place are: 1) no change 2) force high 3) force low and 4) toggle. As part of the method herein disclosed, the toggle mode will be used since at each flux reversal to write, we want the output pin to toggle. The output compare feature also has the option to force an action using software.

The force branch of the program will be entered when a 1 is the next flux reversal to be written. This means that at the time that a flux reversal is read, which must have happened to force us into this subroutine, a flux reversal must immediately be written. This path of execution will only take 88 cycles using a 2 MHZ microcontroller.

The OC branch of the program will be scheduled when a 0 is the next flux reversal to be written. The time for the next write must be calculated since no action needs to take place since no flux reversal will be written. Also, since no flux reversal will be written, the read cycle will not take place, since the subroutine is only entered when an edge is detected by the read head.

Therefore, in this subroutine the time that has passed between when the last flux reversal was written and the time when it is read (present time) is added to the present time to determine when the next flux reversal is to be written. This time is then written into the OC register which will force a toggle at the desired time. This path of execution will take 86 cycles.

Based on 88 cycles per channel as the worst case and three channels, in addition to 28 cycles for the polling routine, the minimum time flux reversals can be computed are as follows:

time=(88*3+28)cycles*0.5 *us*/cycle=146 *us* which would be in the desired time constraint corresponding to 15 inches per second.

However, if only one track were used, the polling routine would only take 7 cycles, and the time could be computed as follows:

time=(88+7)cycles*0.5 us/cycle=47.5 us/cycle, which would allow a swipe speed of barely slower than 50 inches per second.

In one of the preferred embodiments, the method includes first reading the data from each channel and dumping it to memory, and then processing the data in memory and storing it in the form of 111 for a 1 and 101 for a 0. Then it is an easy task to retrieve every other bit to have the final data.

The microcontroller 2 has a limited amount of internal Random Access Memory (RAM), for data storage and program execution. In order to dump the value of the time of each edge to memory, additional memory will be required. For each flux reversal, two bytes of memory are required to store the 16 bit time in memory. The memory needed to hold the intended flux reversals is calculated as follows, based on 210 bits per inch on two tracks (420 flux reversals per inch max) and 75 bits per inch on one track (150 flux reversals per inch max).

memory=(420+420+150)*flxrev*/inch*3.25 inches/card=3217 bits

Based on 420 flux reversals per inch on two tracks and 150 flux reversals per inch on one track and a track length of 3.25 inches, 6.4 kilobytes of memory would be needed just for the storage of the times. Of course, additional memory would be needed for processing the data. The design of the hardware is based on 8 kilobytes of external memory for this purpose.

Figure 10:
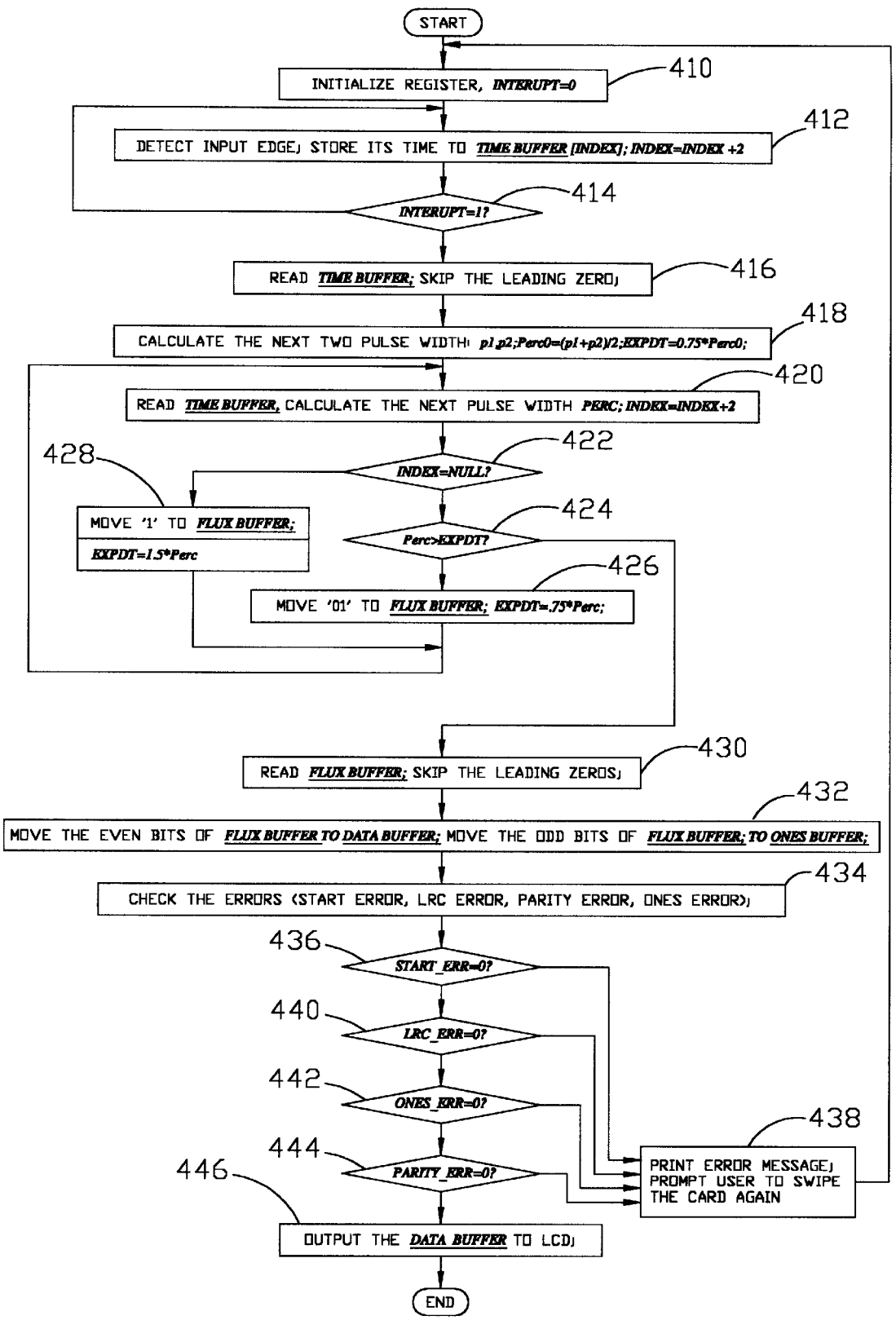
FIG. 10 is a flow chart of the read process.

FIG. 10 is a flow chart of the most preferred embodiment of the read process utilized with this invention. The read process starts with the initializing of the register Interrupt and setting to 0 410. The read head detects an input edge and the time is stored to the time buffer 412. The index is set to index+2 so that the process proceeds through the array in the time buffer. The system checks to see if the interrupt flag is equal to 1 (414). If the interrupt is not equal to 1, then the system loops back to step of detecting input edge and storing its time to the time buffer (412). If the interrupt is equal to 1, the end of the card has been reached. Then the time buffer is read, and wherein the 5 to 10 leading zeroes are skipped (416).

The next two pulse width periods (p1, p2) are calculated. An average pulse width period (denoted as Perc0) is calculated as Perc0=(p1+p2)/2. Then, the expected pulse width (Expdt) is calculated as follows: Expdt=0.75*Perc0 (see step 418).

Next, the time buffer is read, and the next pulse width (Perc) is calculated and the Index is set equal to the value of the Index+2 (see step 420). The Index is then checked to see if it equals null (422). The memory location "null" has the address of end of time buffer. If no, then it is determined whether the Perc is greater than the Expdt (424). If Perc is greater than the Expdt, a "01" is moved to the flux buffer and Expdt is recalculated as: Expdt=0.75*Perc (426). If Perc is less than the Expdt, a "1" is moved to the flux buffer (428) and Expdt is recalculated as: Expdt=1.5*Perc (428). From this point, the system loops back to step 420 i.e. the time buffer is continued to be read, and the next pulse width (Perc) is calculated and the Index is set equal to the value of the Index+2, etc.

In the event that the Index equals null, the reading of the flux buffer will be started with the leading zeros being skipped (30). Next, the even bits of the flux buffer are moved to the data buffer. Additionally, the odd bits of the flux buffer are moved to the ones buffer (432). Then, the system checks for errors, and more particularly, a start error, a LRC error, parity error and the ones error (434). The data buffer will contain the information on the card. The ones buffer should contain all ones if no error in reading has occurred.

More particularly, if the Start err is equal to zero (436), then the system will print an error message and could prompt the user to swipe the card again (438); thus, the system checks the start sentinel for errors. If the answer to step 436 was no, then the LRC_err is checked to see if it equals zero (440); if yes, then the system will print the error message and could prompt the user to swipe the card again (438). If the answer to step 440 was no, then the ones buffer is checked i.e. is Ones_err equal to zero? (442). If yes, then the system will print an error message and could prompt the user to swipe the card again 438. If the step 442 was no, then a parity check is performed i.e. is Parity err equal to zero? (444) If yes, then the system will print an error message and could prompt the user to swipe the card again 438. If the answer to step 444 was no, the output data in the data buffer is decoded according to the ISO/IEC standard and is sent to the LCD 446 and the transaction process can be completed.

Figure 11A:
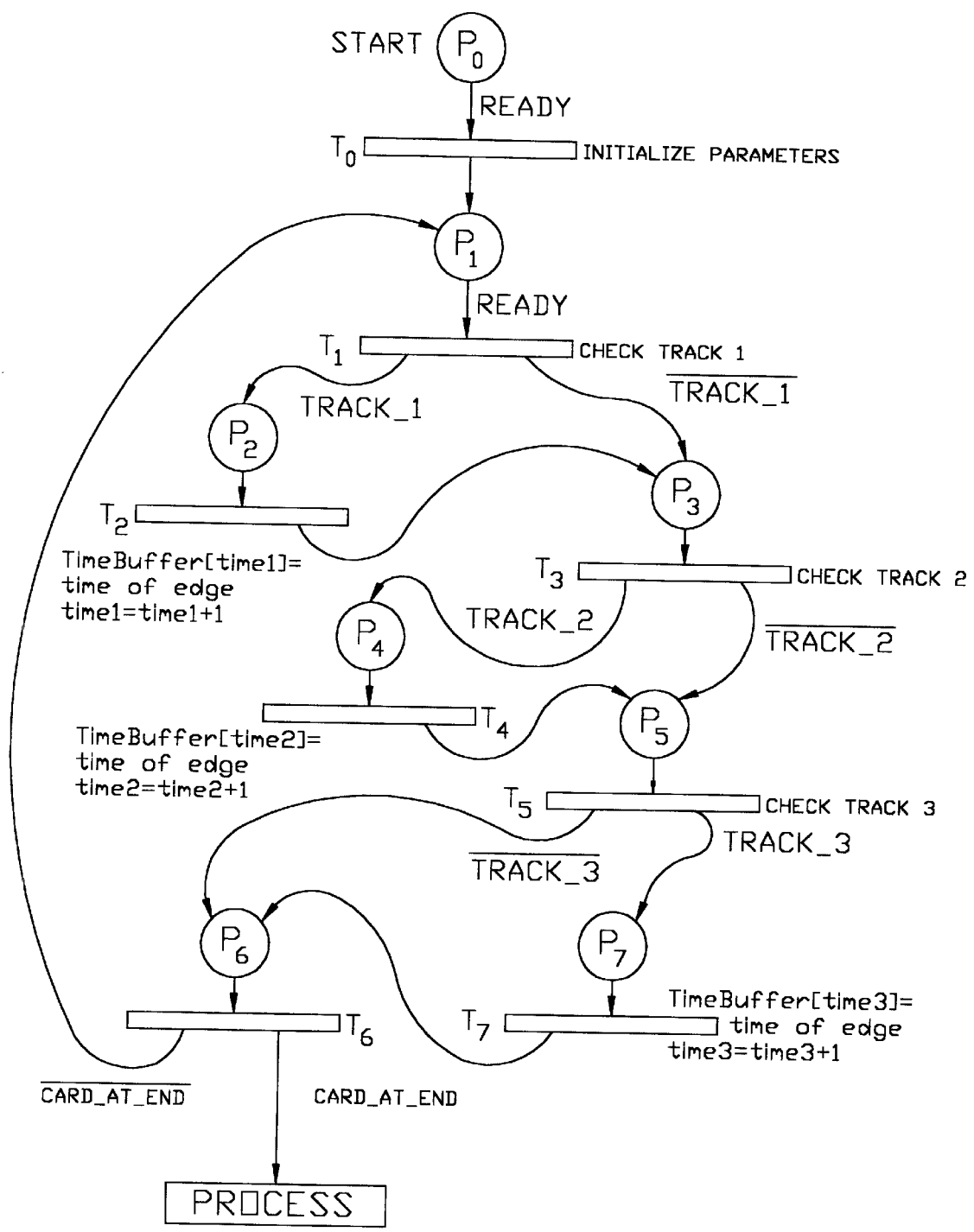
FIG. 11a is a flow diagram of the read process occurring on three tracks contained on the card.
Figure 11B:
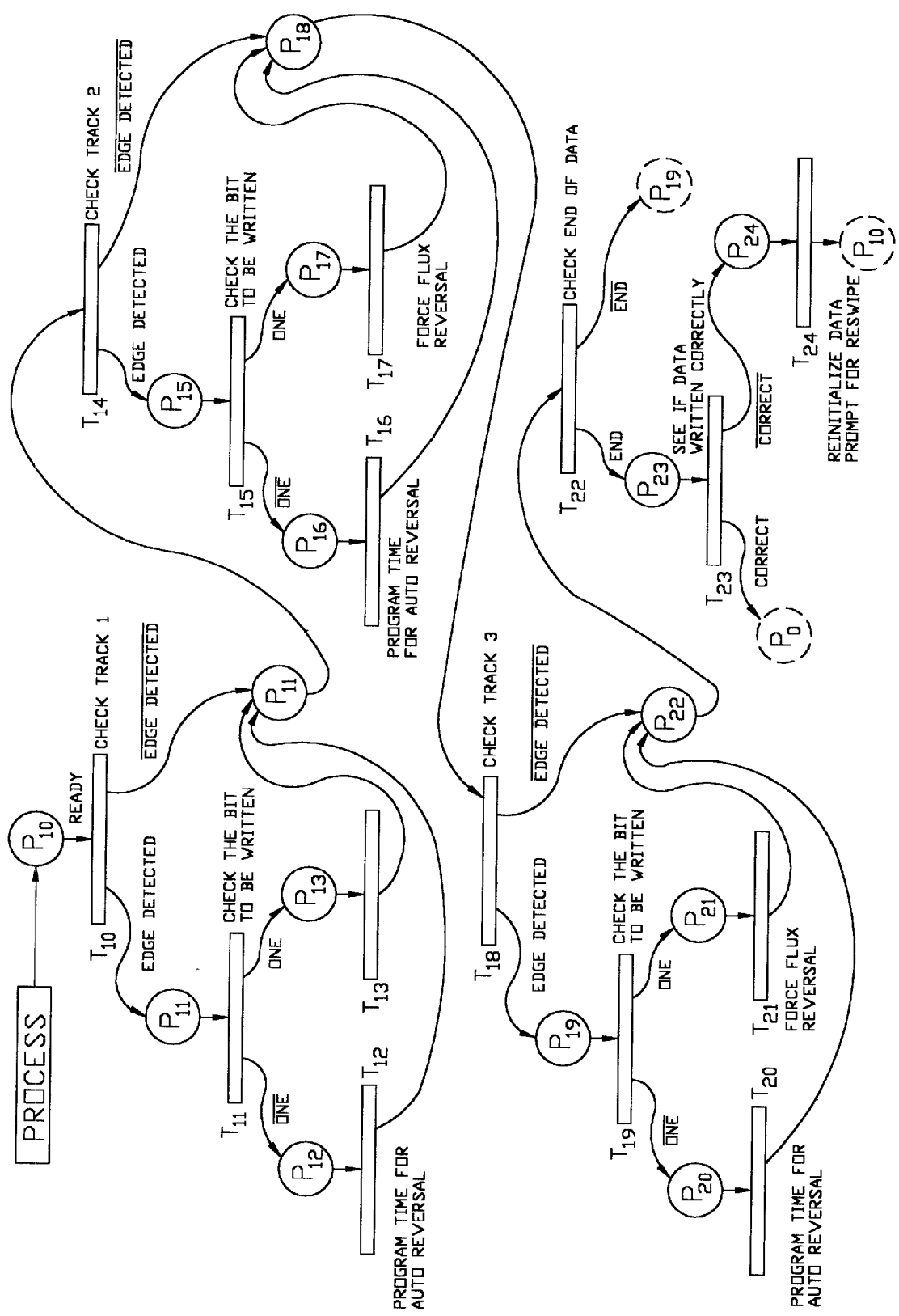
FIG. 11b is a flow diagram of the write process occurring on three tracks contained on the card.

FIG. 11*a* is a flow diagram of one embodiment of the read process occurring on three tracks contained on the card. FIG. 11*b* is a flow diagram of the write process occurring on three tracks contained on the card.

The FIGS. 11*a* and 11*b* are drawn in the style of Petri nets which allow the analysis of the behavior of a system. The FIGS. 11*a* and 11*b* allow the system to be modeled logically while also dealing with concurrence. A description of FIGS. 11*a* and 11*b* follows which illustrates an embodiment of the system herein disclosed.

A Petri net consists of four parts: a set of places P, a set of transitions T, an input function I, and an output function O. A place determines the logical state of the system, and a transition constitutes the mathematical part that results in the transfer of the system from one state to one or more states. The instructions in a transition include conditions, which transfer the system from one state to one of many places depending on the condition. The input function I is a mapping from a transition ti to a set of places I(ti), which is a subset of P. These are called the input places of the transition ti. The output function O is a mapping from a transition tj to a set of places O(tj), which also a subset of P, called the output places of the transition tj.

The Petri net for the READ algorithm shows the initial place Po where the card reader is ready to initialize the parameters after the previous service is done the card is removed. The transition To involves an initialization process and thus attains the place P1. Here, it is ready to read another card. At transition T1 the card reader starts reading track 1. This is done irrespective of whether the card is inside the reader or not. If the card is in and there is any data on track 1 to be read the system goes to place P2, does some calculations T2, and goes to P3; alternatively, the Petri net directly goes to the place P3. P3 place indicates that the carder is now ready to read track 2 irrespective of whether it has read track 1 or not. The process continues until it has checked all the three tracks, when the Petri net goes to T6. Here the card is checked if it is completely in (i.e. end of data). If it is then it goes to the transition block named PROCESS where further calculations are done. Alternatively, the Petri net loops back to P1 where it is ready to read track 1 again. As long as a new card has not been inserted, the Petri goes through the loop P1T1P3T3P5T5P6T6P1 until it senses data on one of the heads. The Petri net for the WRITE algorithm is similar.

Figure 12:
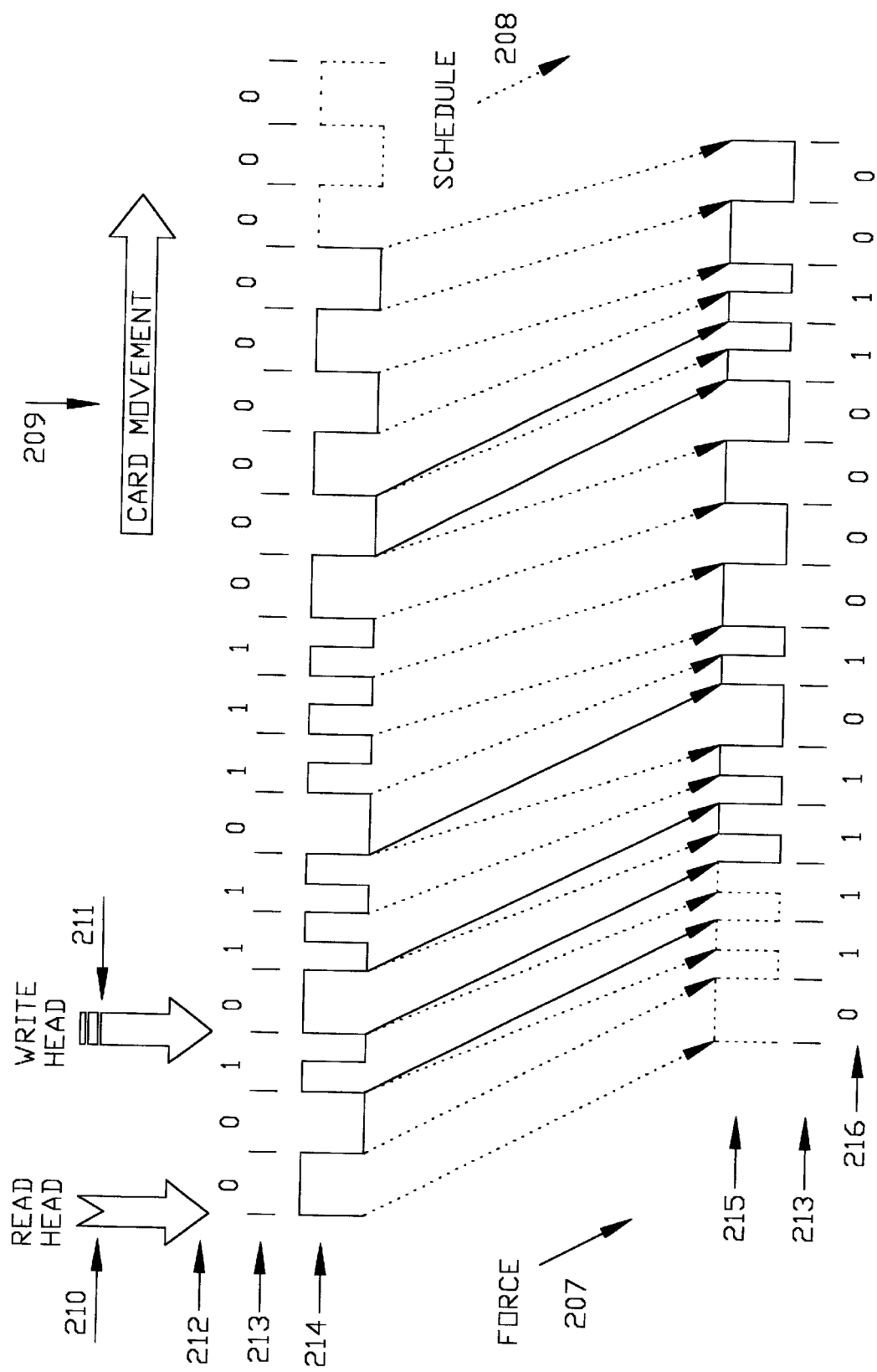
FIG. 12 is a timing diagram for the preferred embodiment of the write algorithm.

FIG. 12, which is a timing diagram of the most preferred embodiment of the write process, will now be described. The steps to perform a given debit card transaction are listed as follows: a) with the insertion of the card into the reader/writer system the entire information of the magnetic stripe is read; b) the read information is processed and decoded by the novel process; c) the card holder is asked to enter the PIN number; d) the authentication process is executed; e) the card holder is asked to enter his request(s); f) the requested task(s) is authorized; g) the card holder is asked to pull out the card; h) the new data is written on the card using the read/write process; I) the requested task(s) is executed.

In FIG. 12, pulse trains 214 and 215 in accordance with two frequency coherent phase recording code are shown for demonstration of the novel method herein presented. The encoding technique is also known as two-frequency recording. These pulse trains (214, 215) are recorded in accordance with the Akian or the two frequency coherent phase recording code. According to the two frequency recording technique, whenever the pulse train has a high frequency, it is designated as a binary "1" state, while the lower frequency pulse is designated as an "0" state. The distance between the two clocking flux transitions is called a bit cell. The bit cells are designated by markers 213 in FIG. 12.

A flux transition occurring between clocking transitions (markers 213) signifies that the bit is a "1" and the absence of a flux transition between clocking transition signifies that the bit is an "0". The pulse trains are encoded as a series of ones and zeros 212 and 216. As an example, pulse train 214 corresponds to the information written on the card and pulse train 215 corresponds to the information that will be written on the card.

In this invention, the preferred distance as shown between the MR read head 210 and the leading edge of the write head 211 must be at least three times the bit cell distance. In the preferred embodiment, the minimum distance between the read head and the write head for track 2 with nominal bit density of 75 bpi is 1.017 mm, and for track 1 and track 3. with bit density of 210 bpi is 0.363 mm.

It should be noted that at present, the preferred embodiment is a three (3) bit cell distance. However, with faster microcontroller, it will become possible to implement read/write in a two (2) bit cell. The ISO/IEC CD 7811-6 Flux Transition Spacing Variation Standard is attached and is incorporated herein by express reference thereto.

Once a magnetic stripe has been written to by the write head, there will be two bit cells at the end that will not be written. However, the two bit cells are located before the leading zeros that are specified as clocking zeros according to the ISO/IEC CD 7811-6 standard. The card moves with variable velocity in direction 209. The flux transitions are scheduled 208 and forced 207 by the micro controller 2 that is used to read the encoded information 212 from the magnetic stripe and then to write the desired information 216 on the magnetic stripe according to the method that is illustrated in the preferred embodiment in a flowchart given in FIG. 12.

Whenever a transition is forced 207, there will be a delay that is dependent on the speed of the microcontroller 2 itself while the scheduled transitions 208 occur without any delay. However, the scheduled transitions will contain the speed variation between one bit cell distance on the card. The calculation of the timing accuracy of the system shows the mentioned timing difference is about 0.079% of the time to read a bit cell. This difference will not affect the normal performance of the system.

The number of clock cycles of the microcontroller that can be contained in a bit cell is N, where N=f(Hz)/[S(inch/sec)*TKD(bit/inch)] and S is the speed of swipe, and TKD is the track density. For example, for track 1 and track 3., and a nominal speed of swipe of 10 inches/sec, and a 2 MHZ microcontroller, N=952 cycles per bit cell. For a maximum swiping speed of 60 inches/sec, and maximum density of track 1 and track 3. N=158 cycles per bit cell. If a 25 MHZ microcontroller is used N=1984 cycles per bit cell. For track 2, N will be 2.8 times larger than N for track 1 and track 3. N/2 is the maximum number of machine clock cycles that is available to detect a flux transition, schedule a transition, and force a transition.

Figure 13A:
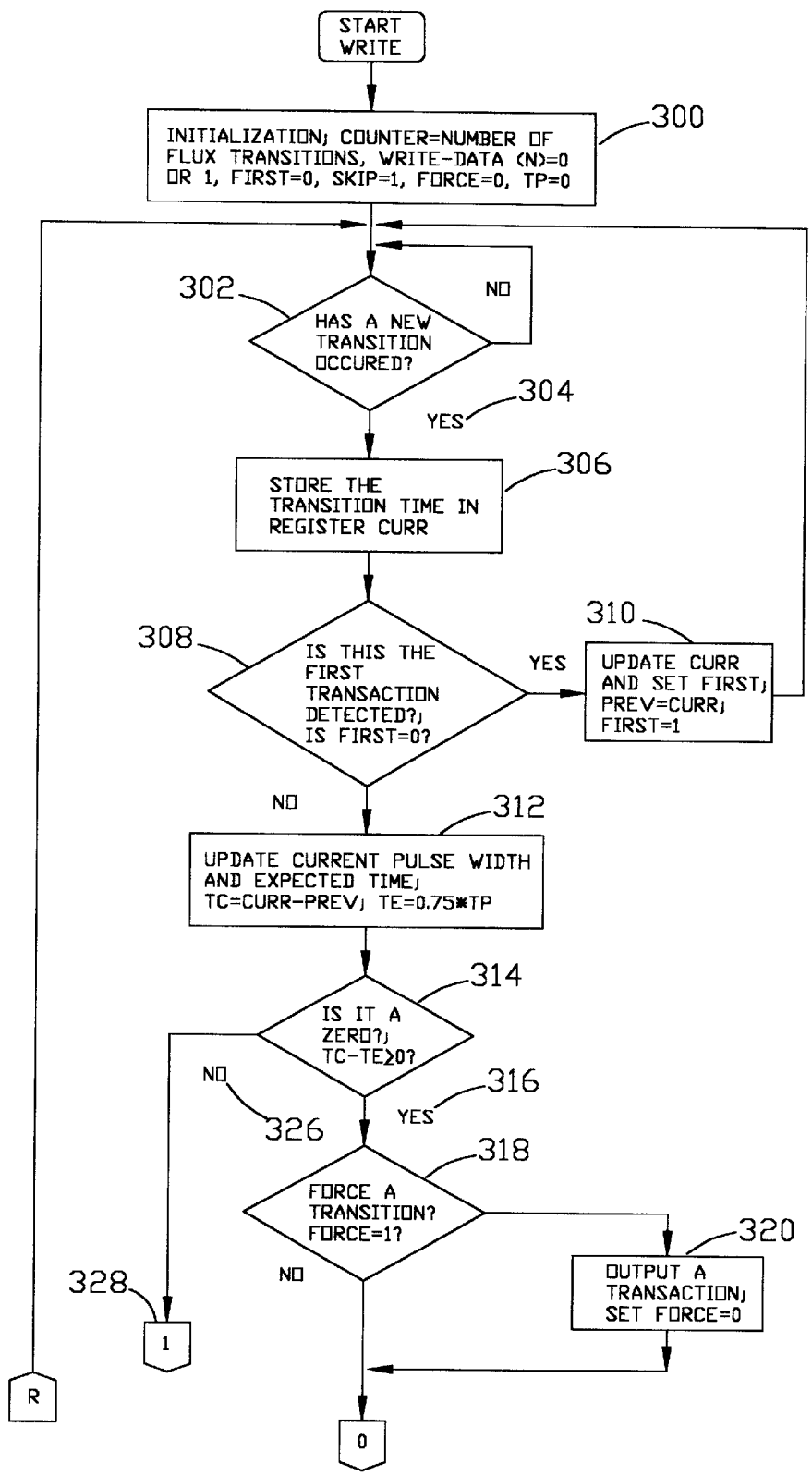
FIGS. 13a and 13b are the flow charts for the write algorithm.
Figure 13B:
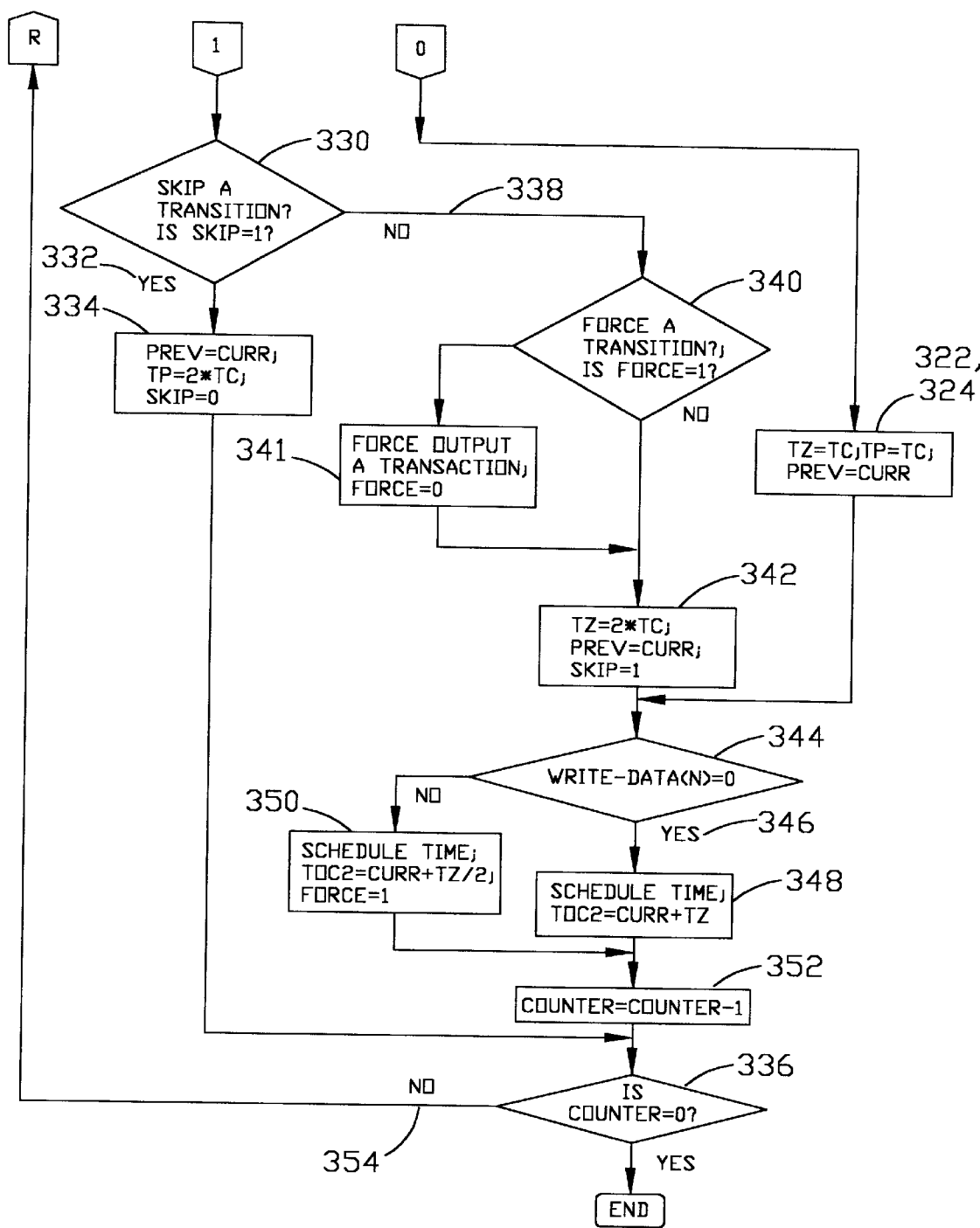

Once the card holder is signaled to pull the card, the write process begins. The write process shown in FIGS. 13a and 13b starts with initialization to set all of the parameters to their initial values 300. The microcontroller 2 waits to detect a transition 302. Once a positive transition or negative transition is detected 304, its timing value is stored in a word in the memory that is address designated as CURR 306. If the detected edge is the first edge 308, a word in memory called FIRST is set to one 310. The content of CURR is stored in PREV and then the system waits for the next transition to occur.

Once the next transition occurred, its timing is stored in CURR. The current pulse time TC is calculated as the difference between the two detected edges 312. From the previous pulse width, TP, the expected pulse width, TE, is calculated. TE is set to 75% of the PREV pulse width, TP.

The value of the current pulse width, TC, is compared with the value of the expected pulse width, TE 314. If the current pulse width, TC, is greater than the expected time 316, TE, a ZERO bit is detected. Then it checks to see if FORCE flag is set to one 318; if the answer is yes, a transition is forced to the output and FORCE is set to zero 320. The pulse width for ZERO bit, TZ, is set equal to the current pulse width, TC 322. The previous pulse edge, PREV, is updated to the current pulse edge, CURR 324.

Otherwise, if the pulse width, TC, is less than the expected time 326, TE, a ONE bit is detected 328. It checks the value of flag called SKIP 330. If SKIP is equal to one 332, it updates the PREV by setting it equal to the current pulse edge, CURR, and calculates the new ZERO bit pulse width, TP=2*TC, and sets the value of SKIP equal to zero 334 and checks the value of the counter to see if write process is over or if it should wait to detect another transition 336.

If SKIP value is equal to zero 338, it checks the FORCE flag to see if a transition should be forced 340. If yes, it forces a transition and resets the FORCE to zero 341. It then calculates the value for ZERO as bit TZ=2*TC and set, PREV=CURR, and sets SKIP equal to one 342. Next, the value of write-data (N) array is checked 344. If it is equal to zero 346, the time of a transition is scheduled when the main time of microcontroller 2 reaches to the time equal to the sum of CURR and the ZERO bit pulse width 348. Otherwise, the time of a transition is scheduled when the main time of microcontroller 2 reaches to the time equal to the sum of CURR and the ZERO bit pulse width divided by two 350. It sets the value of FORCE equal to one. The counter's value is decreased by one to take into account that one more bit is written 352. If the counter value is not equal to zero 354, it waits to detect another transition otherwise the write process is over.

The following is the processing steps and layout, according to the teachings of the present invention, to fabricate MR heads for the magnetic stripe applications in the preferred embodiments. The fabrication of the MR head provides for robustness and minimizes crosstalk of read/write head that will be implemented. It is to be understood that prior art MR read/write heads may be used with the apparatus and method herein presented. However, FIGS. 14–21 depict the process for manufacture of the MR read/write head of the most preferred embodiment.

The MR read heads are fabricated on 4" silicon wafers. For production, ceramic substrates for robustness and electroplating of copper for ultrasonic bonding will be used. The current dimension of the read head is 0.120"×0.210", but the size can be decreased to 0.120"×0.070" and smaller. The Bridge MR element is used for noise reduction and temperature compensation. The Bridge MR element can be deleted and its effects can be compensated by using modern electronic circuits. This will reduce the size even smaller. The size of the read head can be reduced to one fourth of its original size. The initial size was chosen large so that wires could be soldered to contacts for testing.

Figure 17:
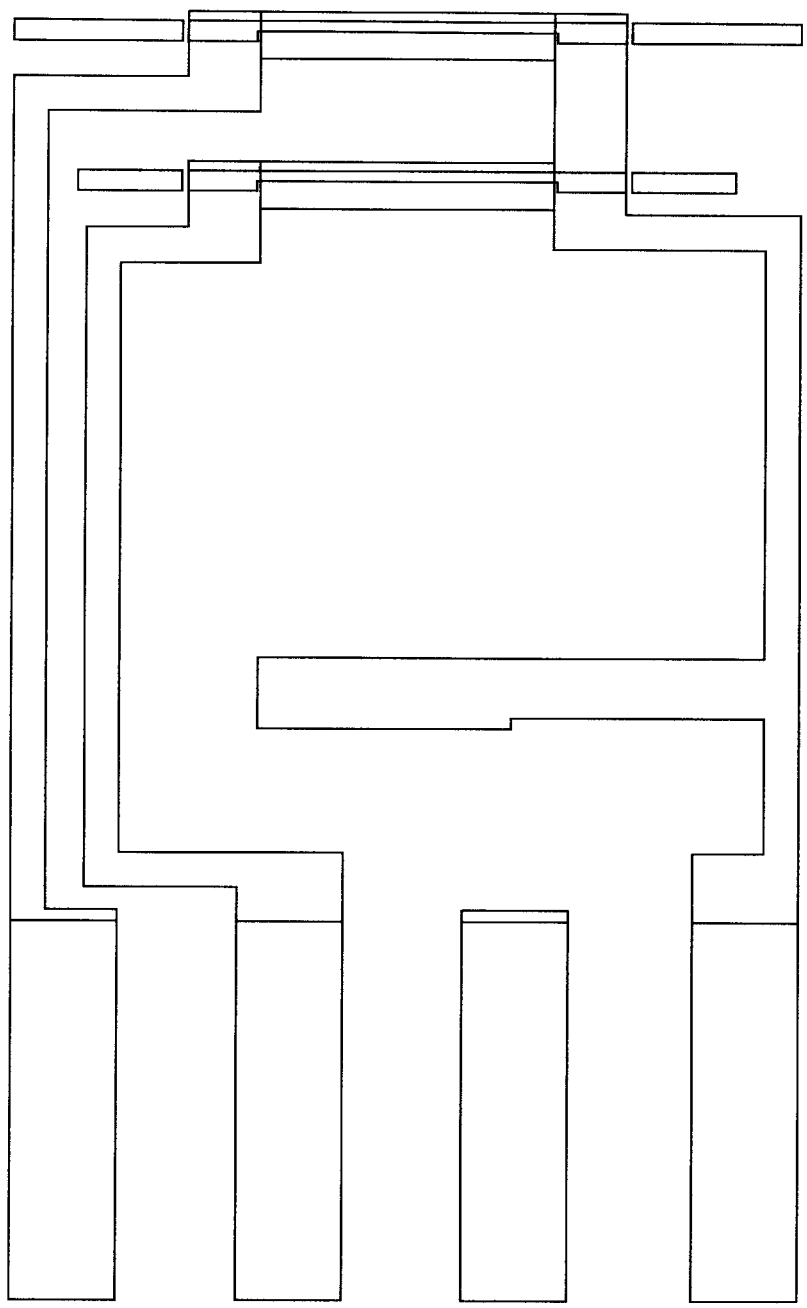
FIG. 17 is a continuation of the illustration of FIG. 16 depicting the copper interconnect layer.
Figure 18:
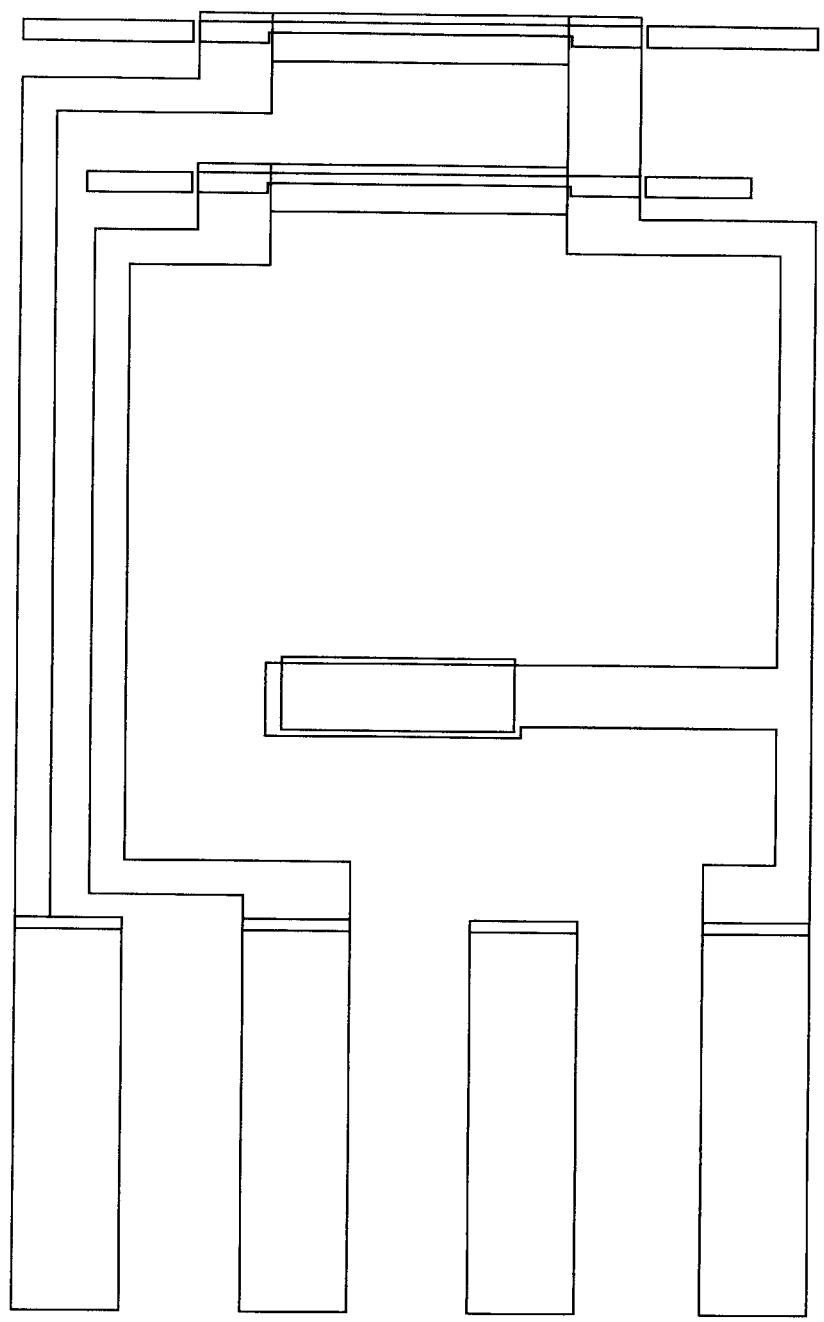
FIG. 18 is a continuation of the illustration of FIG. 17 depicting the contact cover layer.
Figure 19:
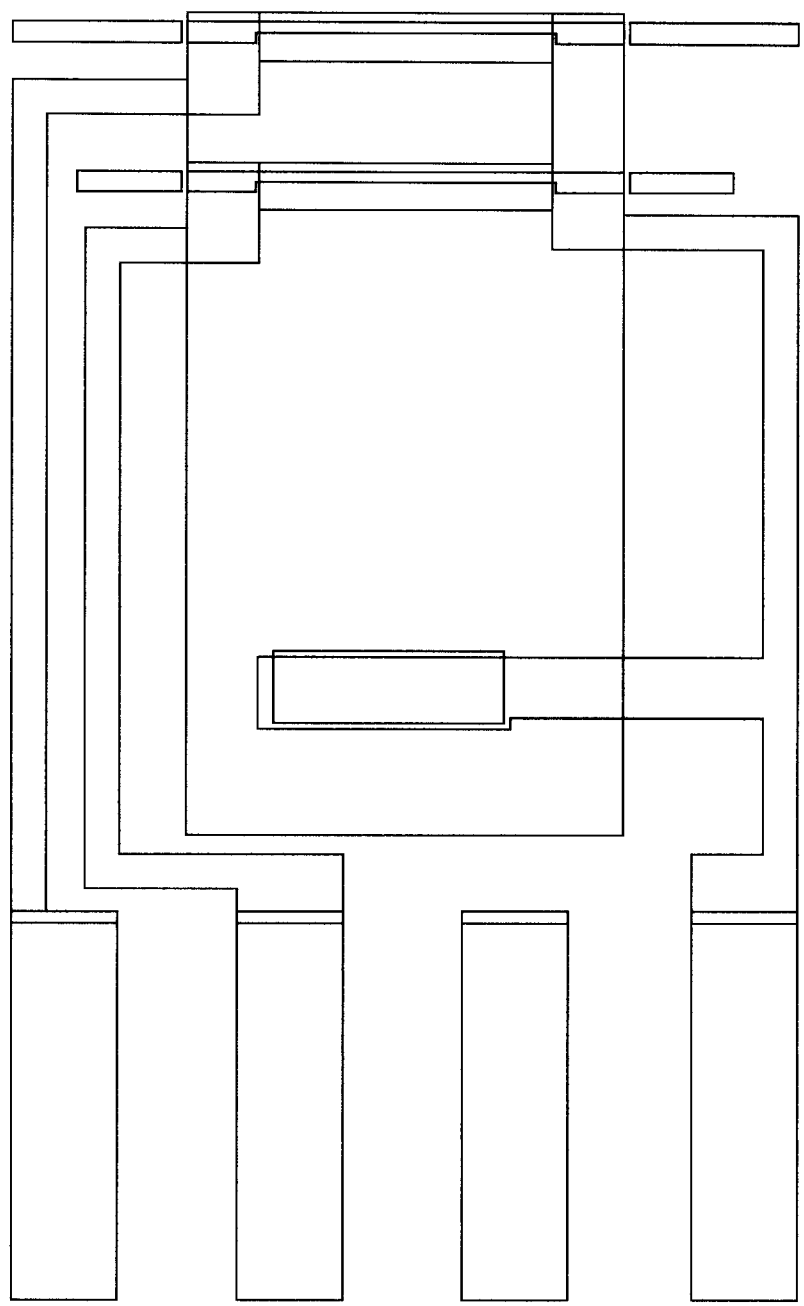
FIG. 19 is a continuation of the illustration of FIG. 18 depicting the bottom core connect layer.
Figure 20:
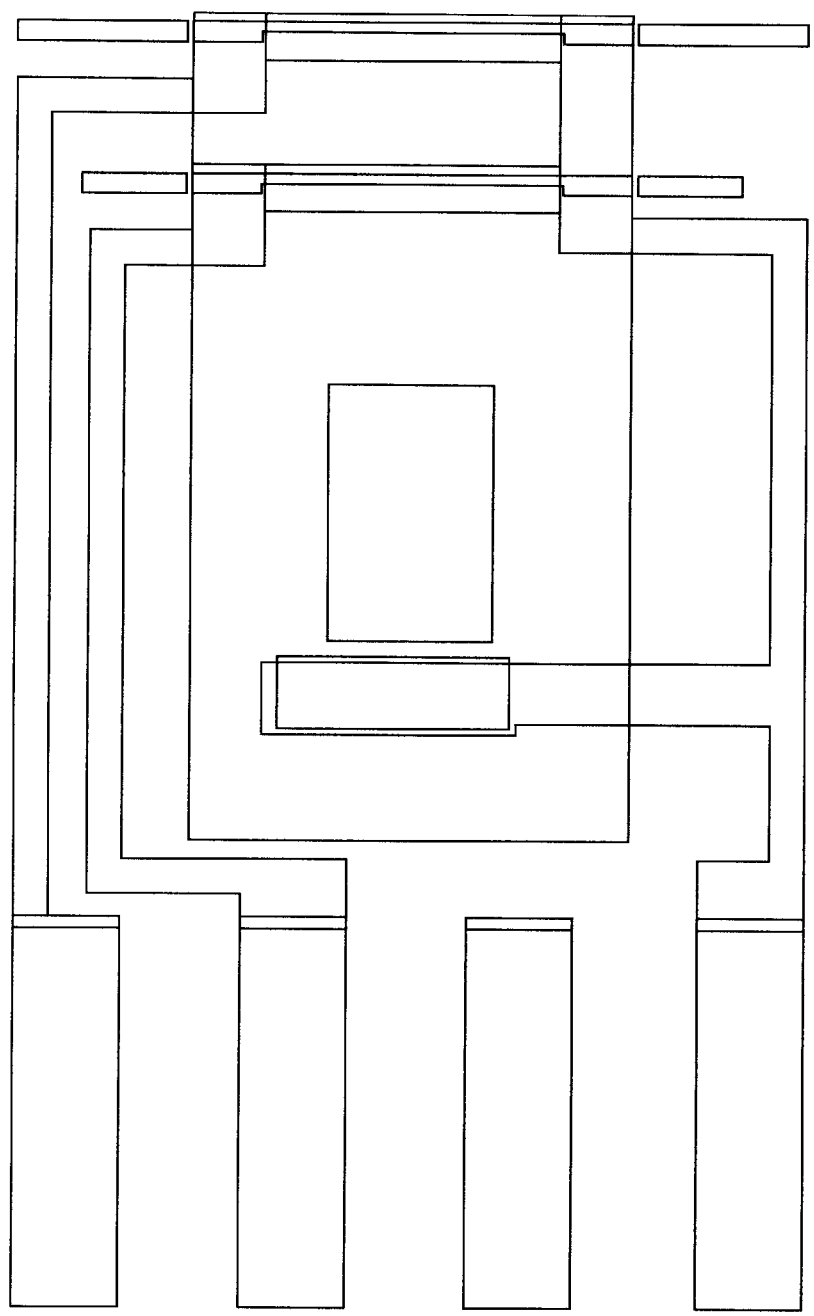
FIG. 20 is a continuation of the illustration of FIG. 19 depicting the core connect layer.
Figure 21:
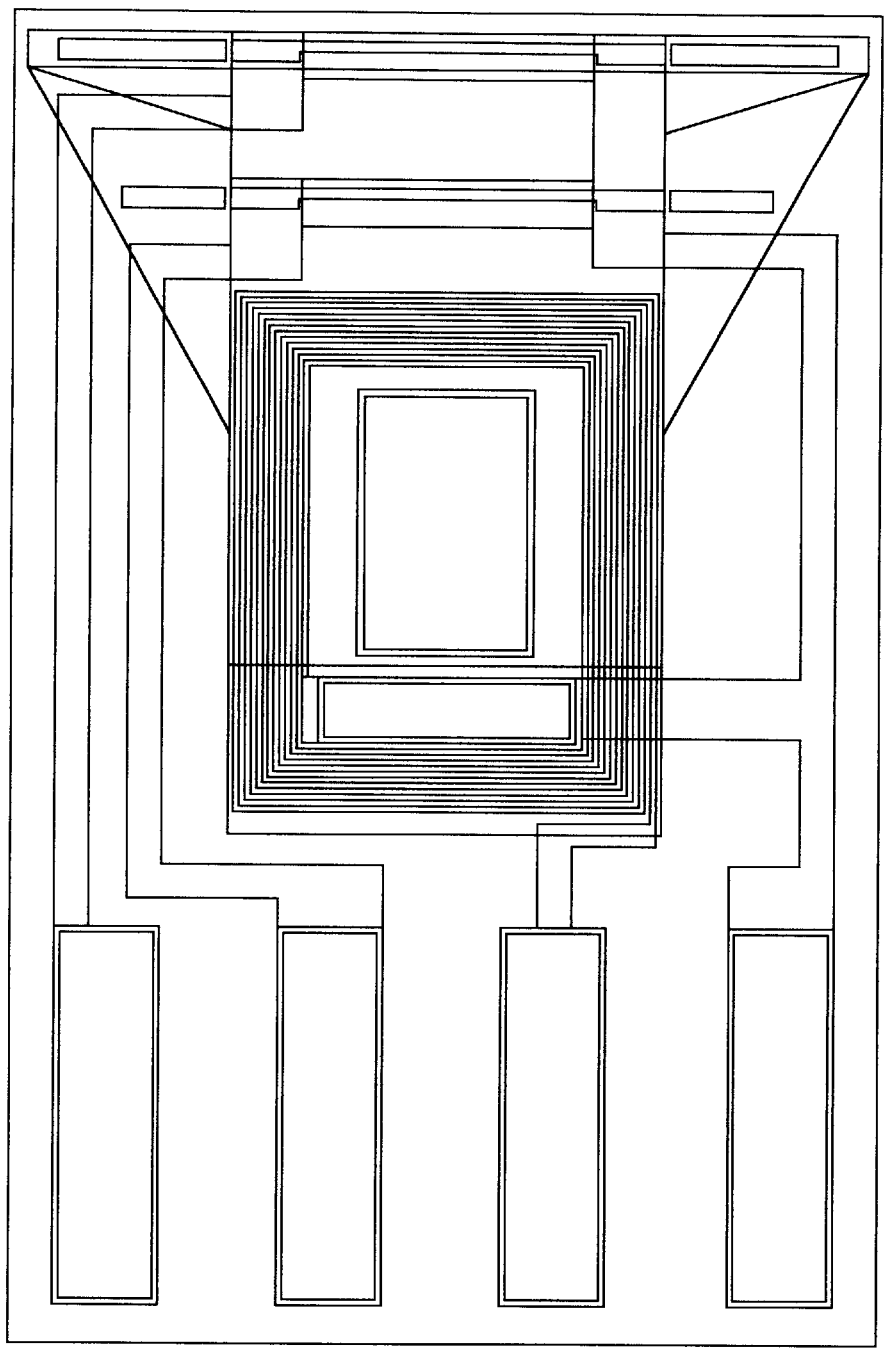
FIG. 21 is a continuation of FIG. 20 illustrating the core connect and top core, write mouth offset and write coil.

The following figures illustrate the process of the fabrication of the read/write head of the most preferred embodiment of the present invention. FIG. 14 is an illustration of the mask for the horizontal bias for the process of fabricating the read/write head of the present invention. FIG. 15 is a continuation of the illustration of FIG. 14 depicting the MR/SAL layer. In the preferred embodiment, FIG. 15 is not a necessary step. FIG. 16 is a continuation of the illustration of FIG. 15 depicting the MR cover layer. FIG. 17 is a continuation of the illustration of FIG. 16 depicting the copper interconnect layer. FIG. 18 is a continuation of the illustration of FIG. 17 depicting the contact cover layer. FIG. 19 is a continuation of the illustration of FIG. 18 depicting the bottom core layer. FIG. 20 is a continuation of the illustration of FIG. 19 depicting the core connect layer. FIG. 21 is a continuation of FIG. 20 illustrating the core connect and top core, write mouth offset and write coil.

The following is a list of the sequential steps involved in the fabrication of the read head of the present invention. The use of wet chemical etching and simple processing steps can reduce the production cost.

ÅStep-1
Wafer Cleaning and Surface Preparation
Step-2
Silicon Dioxide is sputtered: 2000 Å, at 25° C. to 150° C.
Step-3
Permalloy along the easy axis is sputtered: 1000 Å, at 260° C. to 300 ° C.; however, Permalloy may be sputtered at room temperature and then annealed at 280 degree C. for 3 hours.
Step-4
The SAL or Biasing layer is patterned using photolithography and selective etching. The SAL layer is used to bias the MR element in the linear region of operation. The thickness of the SAL layer is 0.707 of the thickness of the MR element. If two MR read heads are to be fabricated for the read head applications or in read/write head applications a single SAL layer (element) is shared between the two MR elements to bias them in the linear region. The biasing (DC) current through the MR elements will flow in opposite directions to saturate the SAL element.
Step-5
Step 2 and Step 3 are repeated: Permalloy thickness; 1420 Å.
Step-6
The MR layer is patterned using photolithography and selective etching.
Step-7
MR element is masked off and copper is sputtered: 7000 Å, at 25° C. to 150° C.
Step-8
The copper layer is patterned using photolithography and selective etching.
Step-9
Protective layer (Photoresist) is deposited (spined) on the MR element (the mask is not shown).
Step-10
The wafer is scribed, and the MR heads are separated and polished.

The head characteristic of the read head that its waveform shown in FIG. 20 are as follow:
Unshielded MR head
Biased in the linear region
Head resistance: 105 ohms
Dimension: 0.0400"×0.001×1000 Å
Current Density 10 to the $7^{th}$ power; A/cm2
Amplification factor: 837

Note that SAL layer can be shared between the two MR elements read heads for read-write-read head combination. The processing steps for write head are similar to the read head processing steps with different masks.

Figure 22:
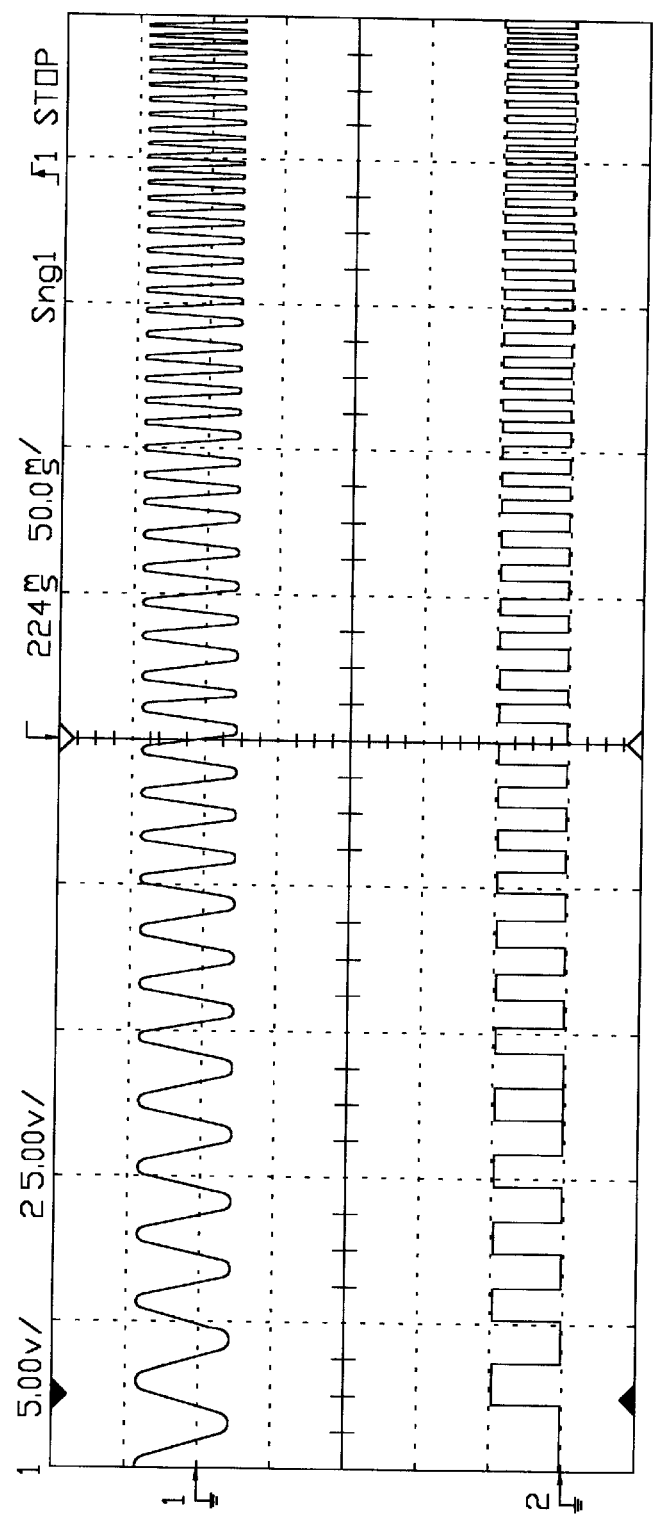
FIG. 22 is a reproduction of the analog and digital wave form generated according to the principles of this invention in response to a series of magnetic fluxes contained on a magnetic stripe.

The FIG. 22 shows a generated analog waveform and a generated digital waveform produced by the MR head fabricated according to the principles of the present invention. The waveform is the response of the MR head to a commercially available card. A portion of the generated waveform is shown in FIG. 22. The digital waveform is generated from the amplified analog signal of the MR head using Schmitt Trigger circuit, as previously discussed. The initial analog signal is not conditioned and represents the true response of the head.

The amplifier and the analog to digital converter circuit, seen in FIG. 23, will now be discussed. The MR read head element 400 and the MR Balance element 402 are connected in a Watson Bridge configuration with a 100 Ω potentiometer ($R_{1p}$-$R_{2p}$). The MR balance resistor is for minimizing the noise by grounding the center pin between MR element and the MR balance resistor. Since the MR element 400 and the MR balance resistors 402 are fabricated close to each other on the wafer their resistance are very close. If there is slight imbalance in their values by adjusting the potentiometer a total balance is achieved. The supply voltage V1 is adjusted to produce appropriate current density (greater than $1×10^6$ A/cm$^2$) in the MR element to maximize the magnetoresistive effect. The input signal voltage is applied directly to the non-inverting terminals of U1 and U2. The instrumentation amplifier (U1-U2), as the first stage of amplification, has very large input resistance which is one the desirable feature of the instrumentation amplifier. The differential gain is a function of a single resistance $R_1$. The second stage is an inverting amplifier (U3). The capacitor C1 (9.5 μF) and resistor R15 work as a filter to filter the DC component of the output signal of the amplifier U3. The U4 is wired as Schmitt trigger to change the signal to the square digital type of signal. The Zener diodes D1 and D2 insure 5.7 volts magnitude signal that is fed into the diode D3 for rectification. The output of the diode D3 is a 5 volts maximum input signal that is fed into a TTL inverter (U5A) to invert the signal and insure TTL logic level going to the microcontroller. SN74121N chip, which is commercially available, is used for the operational amplifiers U1, U2, U3, U4. The inverter DM74L04 chip, which is commercially available, is used for the TTL inverters U5A and U6A.

The values of the resistors are: $R_1$=1 kΩ, $R_2$=0 kΩ, $R_3$=0 kΩ, $R_4$=1 kΩ, $R_5$=1 kΩ, $R_6$=27 kΩ, $R_7$=51 kΩ, $R_8$=3 kΩ, $R_9$=1 kΩ, $R_{10}$=20 kΩ, $R_{11}$=1 kΩ, $R_{12}$=1.2 kΩ. The power supplies values are V(plus)=+15V, and V(negative)=−15V.

In the most preferred embodiment of this invention, the entire read/write system can be integrated into one single chip. The processing of the chip will be into three states. First, the electronic circuit (microcontroller, RAM, ROM, Linear Amplifier, Signal conditioning circuits etc.) will be fabricated utilizing well techniques. Space will be left out for the MR read/write head. Second, the MR read/write head will be fabricated close to the electronic circuits. In the final stage the electronic circuits contact will be un-masked and the MR read/write head will be connect to the electronic circuitry. The steps for reading the signal, processing the signal, and writing to the stripes have also been disclosed.

Changes and modifications in the specifically described embodiments can be carried out without departing from the scope of the invention which is intended to be limited only by the scope of the appended claims and any equivalents thereof

I claim:

1. A process for reading and writing to a magnetic card stripe located on a card with a device comprising a magnetoresistive (MR) read head and a write head operatively connected to a microcontroller, and wherein the process comprises:

placing the read head and write head a distance of at least two bit cells apart and wherein the bit cell distance is the distance between a first clocking flux transition and a second clocking flux transition;

initializing all memory locations in the microcontroller to their initial values;

storing a timing value of said transition in a word in a memory at an address designated as current (CURR);

if the detected edge is the first edge, a word in memory (called FIRST) is set to one and the content of the memory (CURR) is stored in an address designated as previous (PREV);

waiting in a loop for the next transition to occur;

allowing the next transition to occur;

storing the transition time in CURR;

calculating a current pulse time (TC) by calculating the difference between the two detected edges (transitions);

calculating an expected pulse width (TE) from the previous pulse width (PREV);

setting the TE to 75% of the PREV pulse width (TP) (TE0.75TP);

comparing the value of the current pulse width (TC) with the value of the expected pulse width (TE);

if the current pulse width (TC) is greater than the expected time (TE), a ZERO bit is detected;

checking to see if FORCE is set to one, wherein if FORCE is set to one, a transition is forced to the output and FORCE is set to zero;

setting the pulse width for ZERO bit (TZ) to equal the current pulse width (TC), and updating the previous pulse width (PREV) to the current pulse width.

2. The process of claim 1 further comprising:

allowing the next transition to occur;

storing the transition time in CURR;

calculating the current pulse time TC by calculating the difference between the two detected edges;

calculating the expected pulse width (TE) from the previous pulse width;

setting the TE to 75% of the PREV pulse width (TP);

comparing the value of the current pulse width (TC) with the value of the expected pulse width (TE);

if the pulse width (TC) is less than the expected time (TE), a ONE bit is detected;

checking the value of a flag called SKIP.

3. The process of claim 2 wherein the step of checking the value of the flag includes finding that the SKIP value is equal to one, and the process further includes:

updating the PREV by setting it equal to the current pulse width, CURR;

calculating the new ZERO bit pulse width, TP=2*TC;

setting the value of SKIP equal to zero; and checking the value of the counter to see if the write process is over or it should wait to detect another transition.

4. The process of claim 2 wherein the step of checking the value of the flag includes finding that the SKIP value is equal to zero, and the process further includes:

checking the force to see if a transition should be forced so that FORCE is equal to one;

if yes, it forces a transition and resets the FORCE to zero;

calculating the value for ZERO as bit TZ=2*TC and set, PREV=CURR, and sets SKIP equal to one;

checking the value of write-data (N).

5. The process of claim 2 wherein the step of checking the value of the flag includes finding that the SKIP value is equal to zero, and the process further includes:

checking the force to see if a transition should be forced i.e. is force equal to one?

calculating that force is equal to zero;

scheduling the time of a transition when the main time of micro controller reaches to the time equal to the sum of CURR and the ZERO bit pulse width;

otherwise, the time of a transition is scheduled when the main time of micro controller reaches to the time equal to the sum of CURR and the ZERO bit pulse width divided by two;

setting the value of FORCE equal to one and decreasing the counter's value by one to take into account that one more bit is written 352 and wherein if the counter value is not equal to zero, the process waits to detect another transition otherwise the write process is over.

* * * * *